United States Patent [19]

Bloomfield et al.

[11] Patent Number: 5,446,445
[45] Date of Patent: Aug. 29, 1995

[54] MOBILE DETECTION SYSTEM

[75] Inventors: John W. Bloomfield; Rudi A. Bischoff; Robert L. Payne; Scott B. Wagner, all of Hilton Head Island, S.C.; Kim Sang-Gweon; Kim Tae-Sik, both of Kyonggi, Rep. of Korea; Kim Ji-Hyun; Jeong Joon-Young, both of Seoul, Rep. of Korea; Yoo Chang-Hyun, Kyonggi, Rep. of Korea; Dong-II Shin, Seoul, Rep. of Korea

[73] Assignee: Samsung Electronics Co., Ltd., Kyungki, Rep. of Korea

[21] Appl. No.: 19,647

[22] Filed: Feb. 18, 1993

Related U.S. Application Data

[63] Continuation-in-part of Ser. No. 789,187, Nov. 5, 1991, abandoned, which is a continuation-in-part of Ser. No. 727,630, Jul. 10, 1991, abandoned.

[51] Int. Cl.$^6$ .......................... G08B 19/00; B25J 5/00
[52] U.S. Cl. .................... 340/521; 340/522; 340/531; 340/539; 379/37; 379/42; 901/1
[58] Field of Search ............... 340/521, 522, 531, 539; 379/42, 43, 38, 39, 40, 57, 44; 901/1, 8

[56] References Cited

U.S. PATENT DOCUMENTS

| | | | |
|---|---|---|---|
| 4,119,900 | 10/1978 | Kremnitz | 364/424 |
| 4,742,336 | 5/1988 | Hall et al. | 340/539 |
| 4,772,875 | 9/1988 | Maddox et al. | 340/522 |
| 4,857,912 | 8/1989 | Everett, Jr. et al. | 340/522 |

OTHER PUBLICATIONS

"Development of a Mobil Robot for Security Guard;" Teijro Kajiwara et al, 15th ISIR, Jan. 1984.

*Primary Examiner*—Donnie L. Crosland
*Attorney, Agent, or Firm*—Sughrue, Mion, Zinn, Macpeak & Seas

[57] ABSTRACT

A mobile detection system for detecting a fire, gas leak, intruder, or other abnormal condition in a house or an office, and for alerting a central monitor, fire station, police station, or an occupant who is away from the house or office. The mobile detection system comprises a self-propelled movable robot having sensors located thereon. A monitor receives signals from the robot and alerts an authorized user accordingly. An automatic communication control unit includes a telephone transmitting unit for automatically calling an appropriate party in response to a signal from the robot and transmits commands to the robot from an authorized calling party. A radio frequency remote controller for remotely controls the robot. The robot is specifically capable of navigating throughout a house or an office while using its sensors to detect abnormal conditions. In the event that an abnormal condition is detected, the robot initiates communication control unit to alert an appropriate party of the existing abnormal condition. Commands can be provided to the robot either directly through a keyboard on the robot itself, or remotely by way of the radio frequency remote controller or the automatic communication control unit.

23 Claims, 30 Drawing Sheets

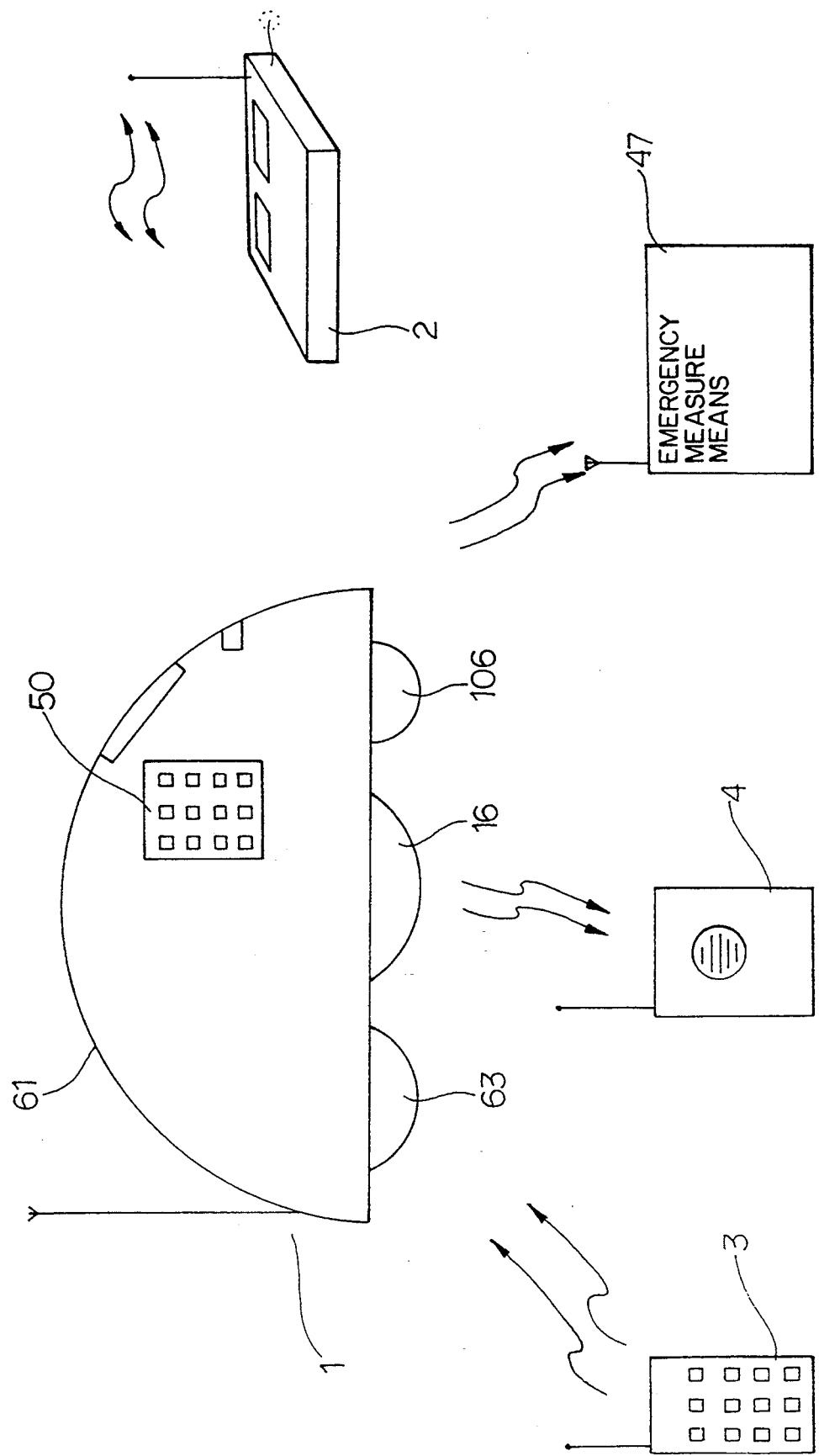

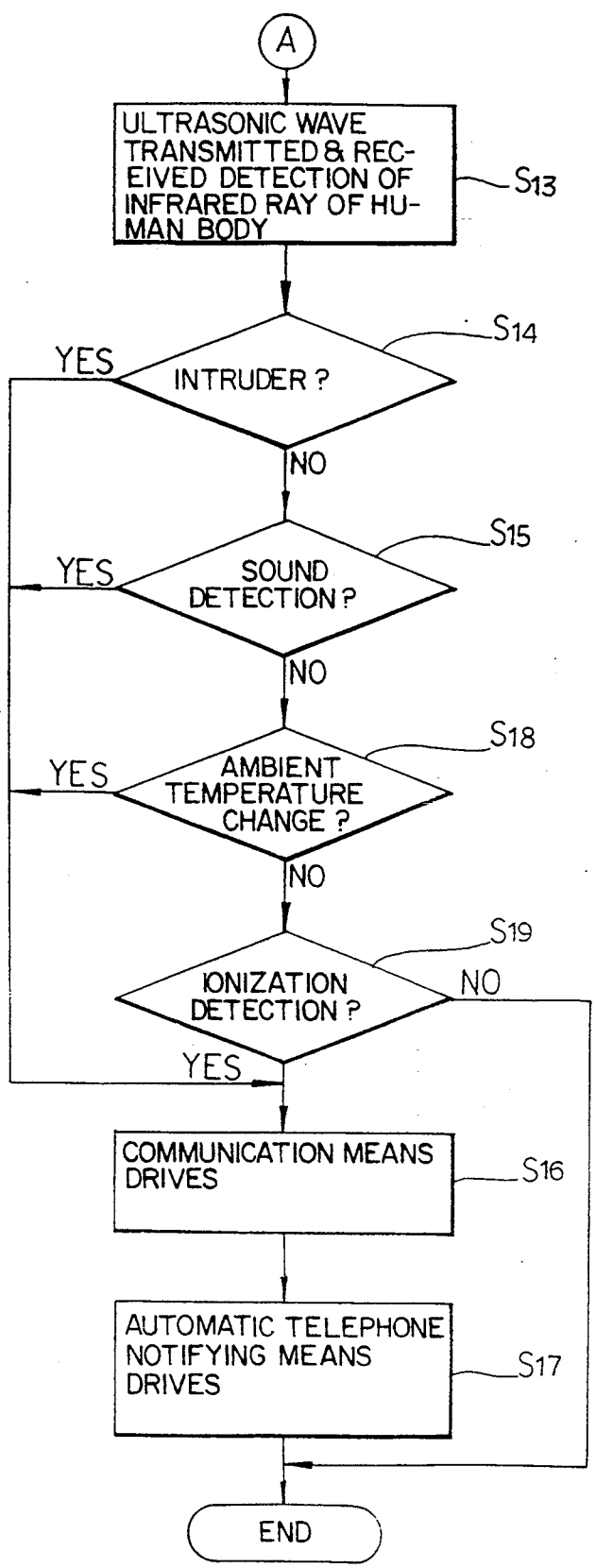

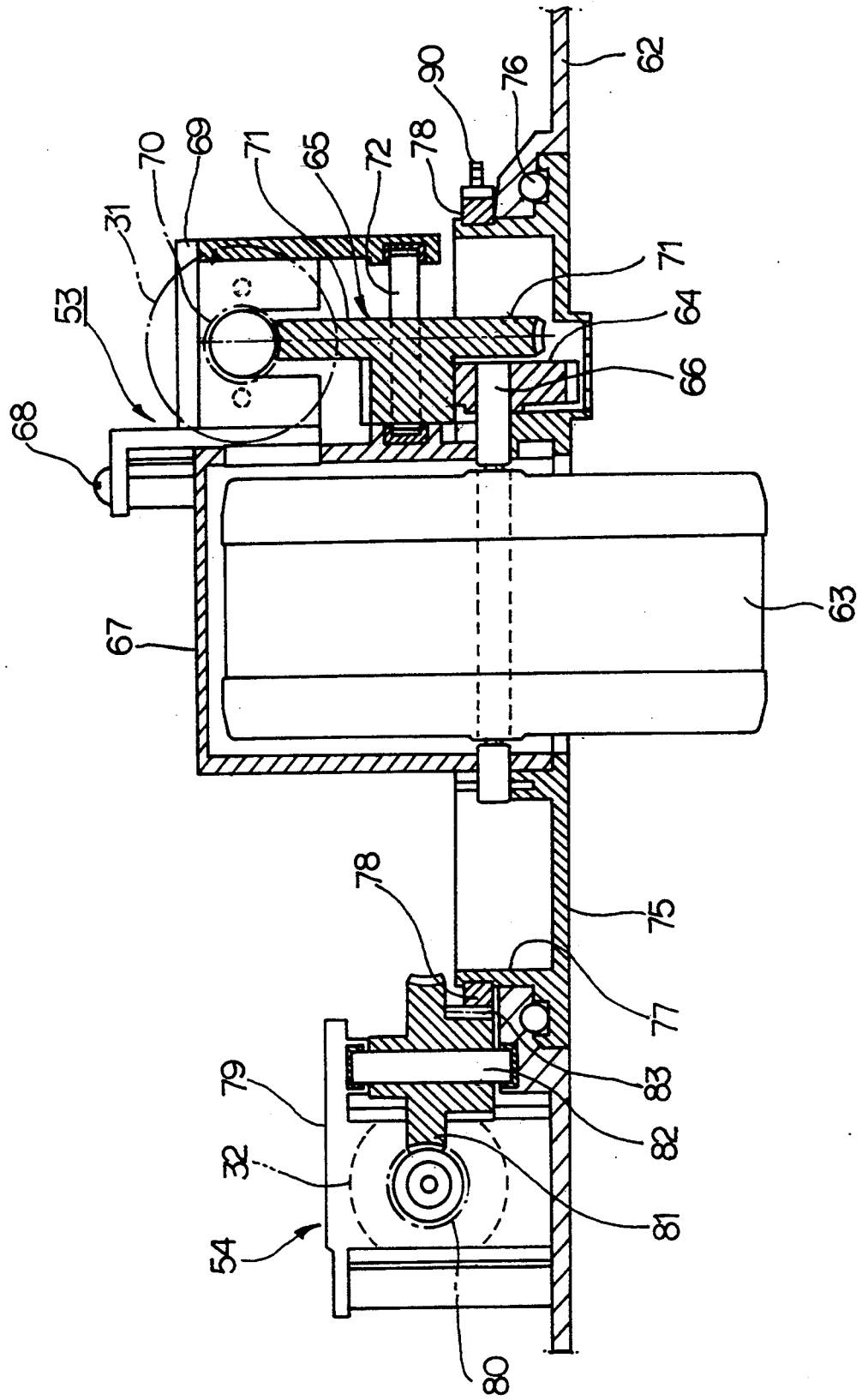

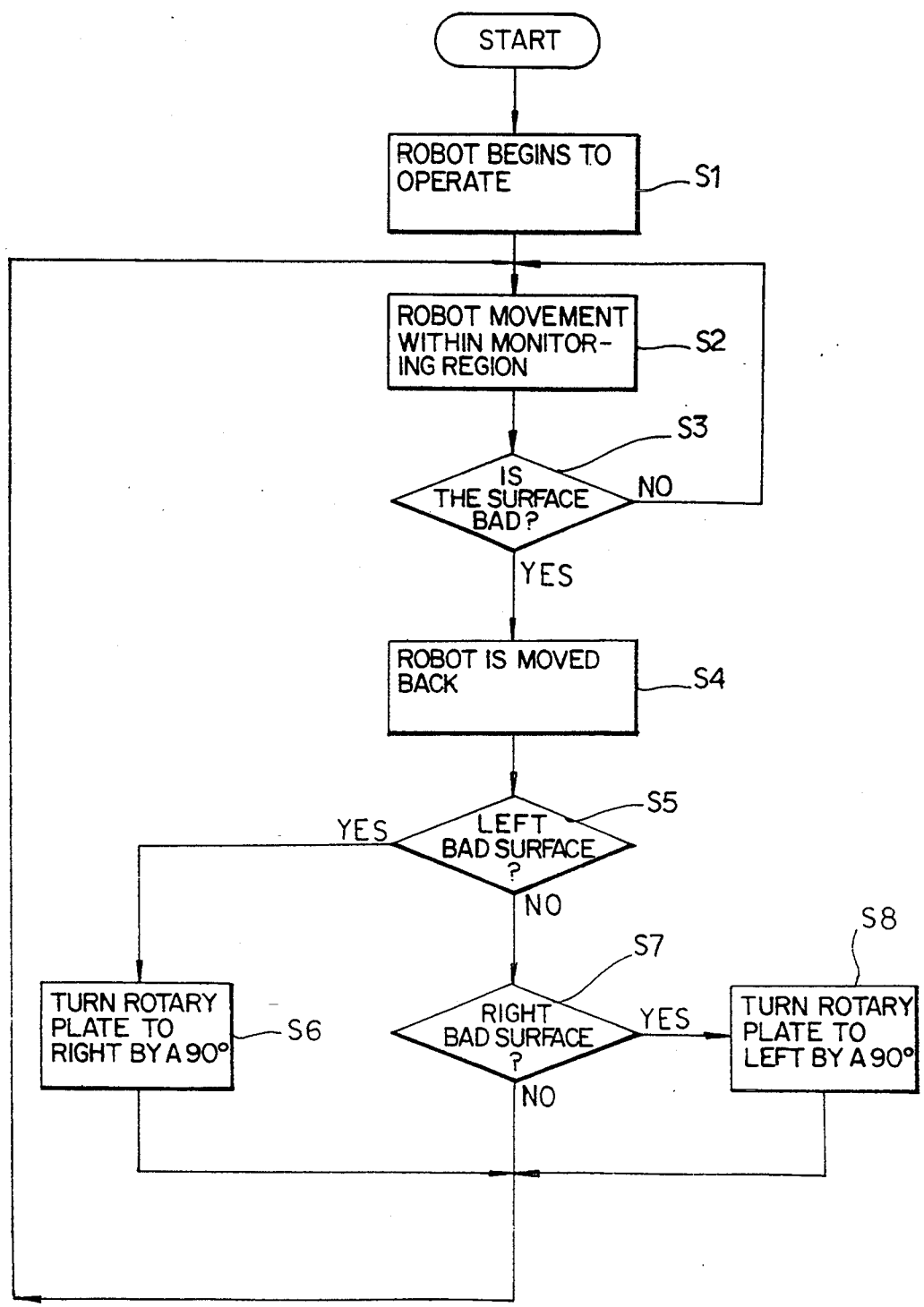

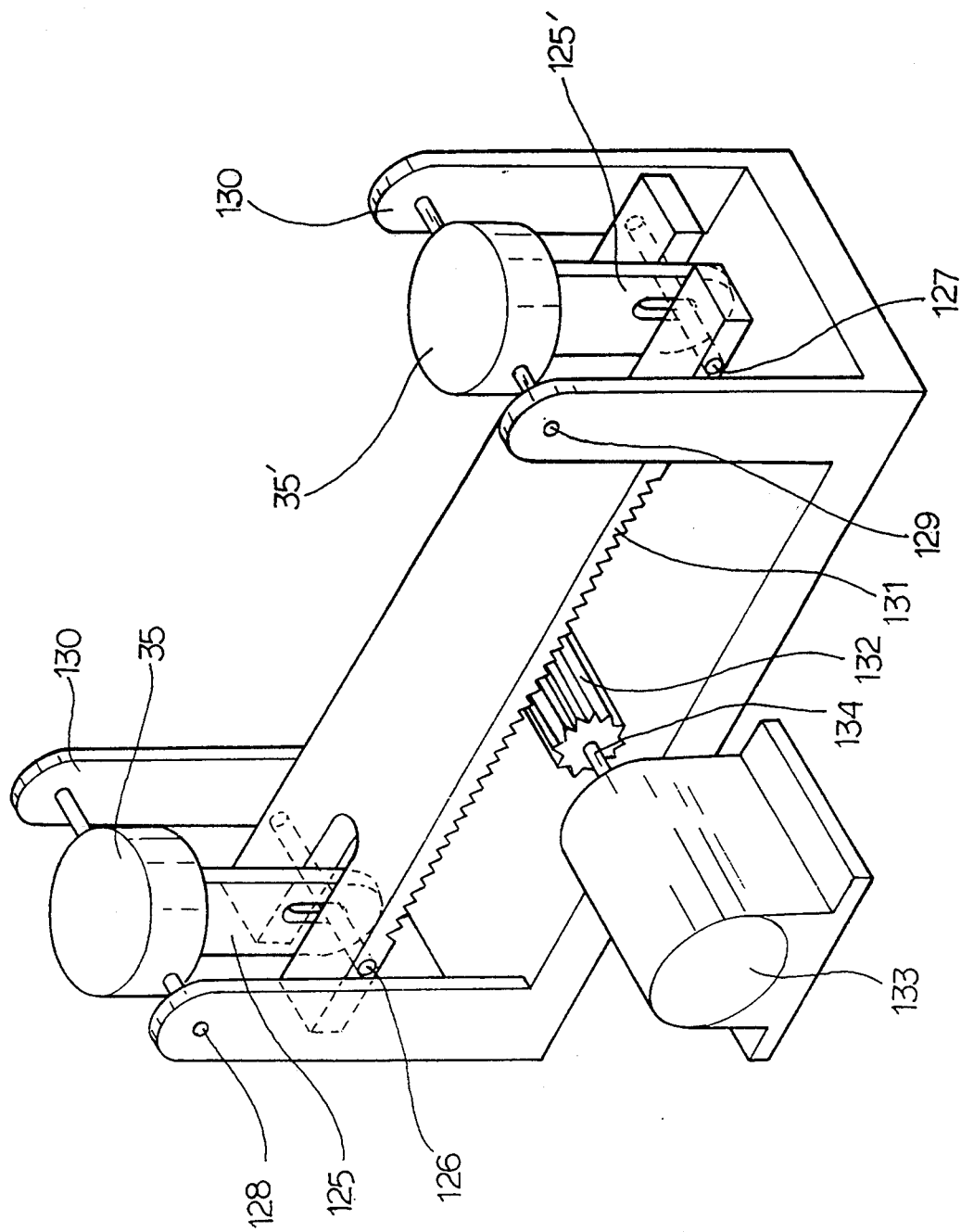

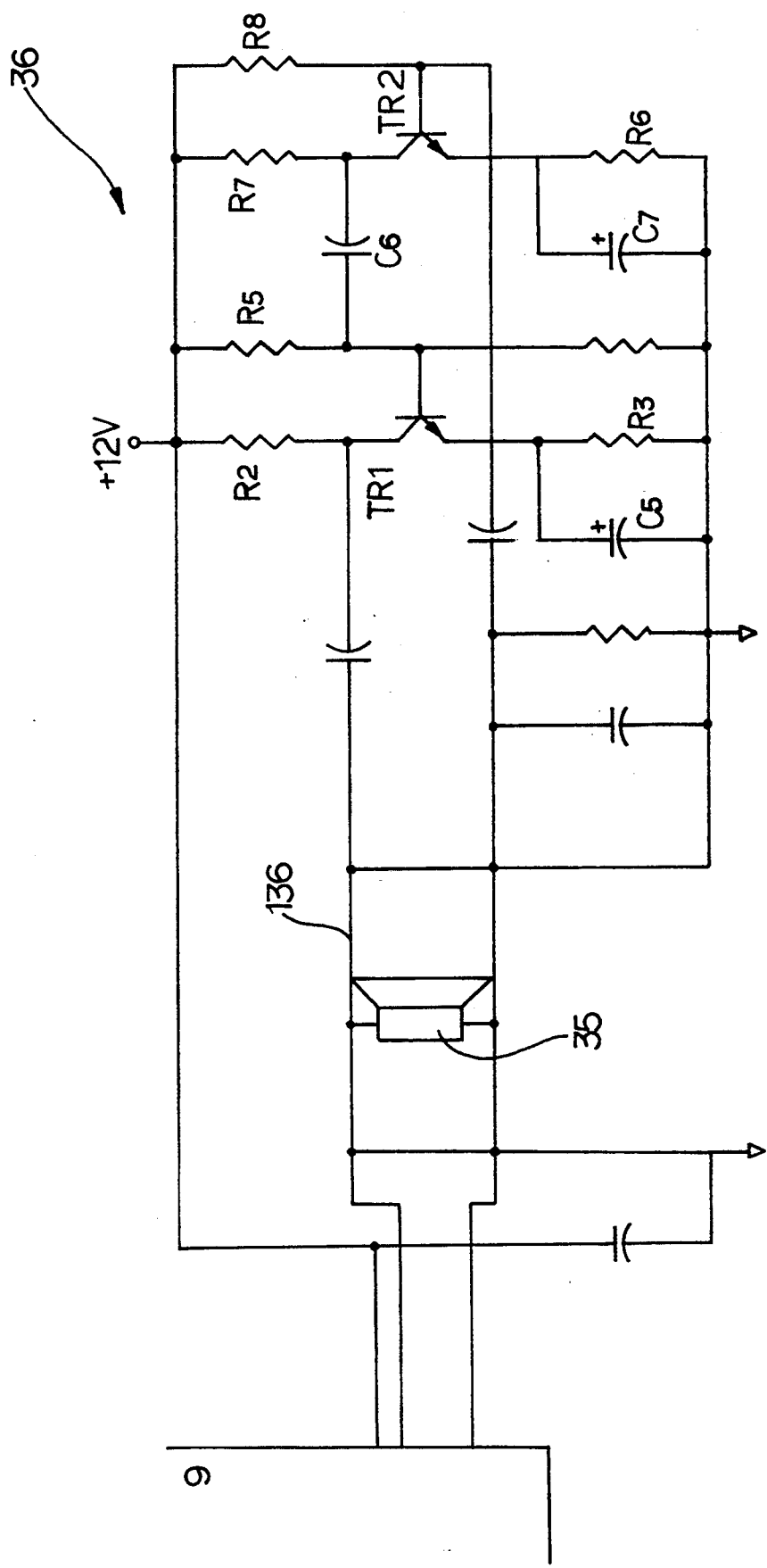
F I G. 12(a)

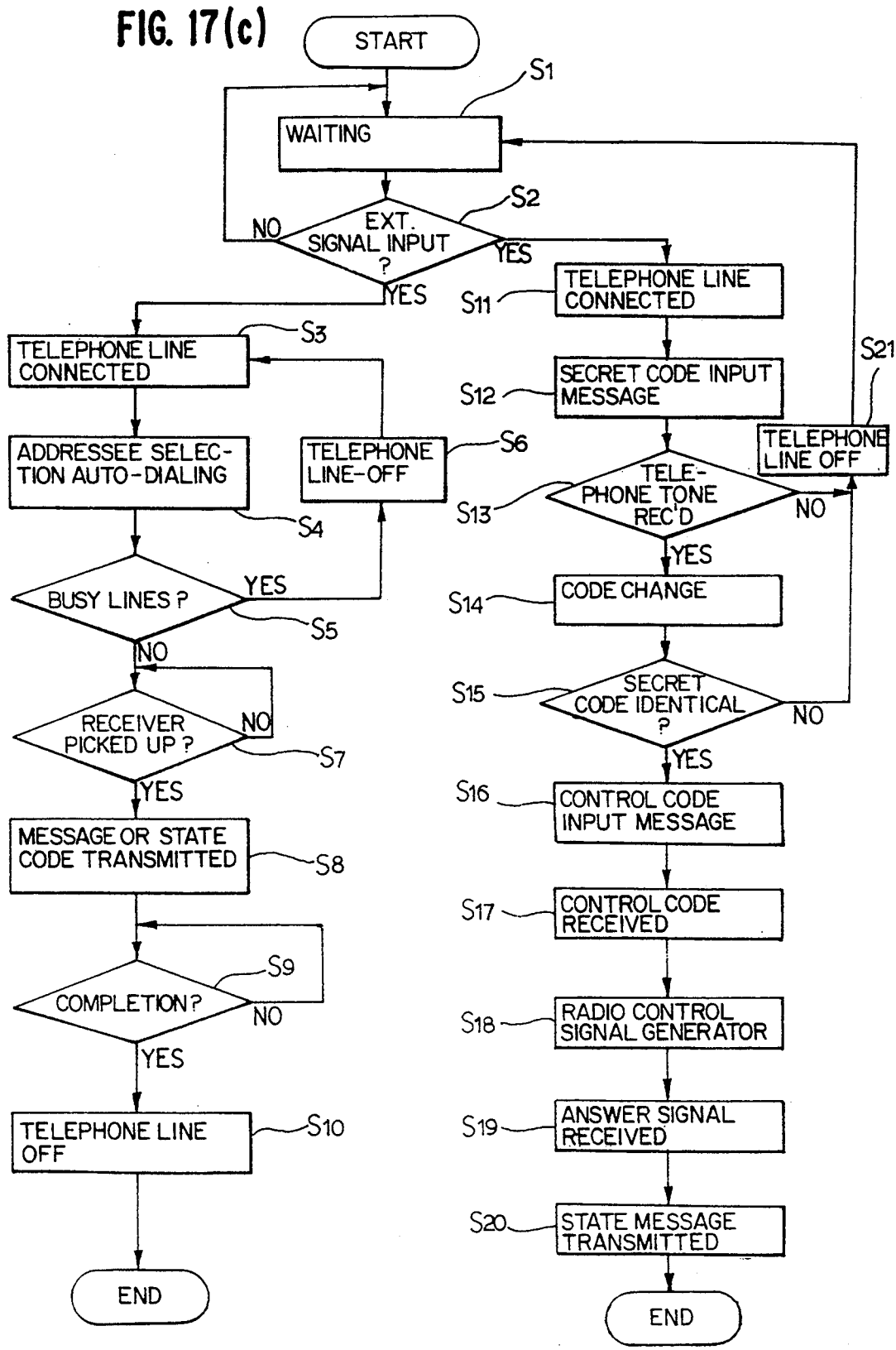

F I G. 18 (a)
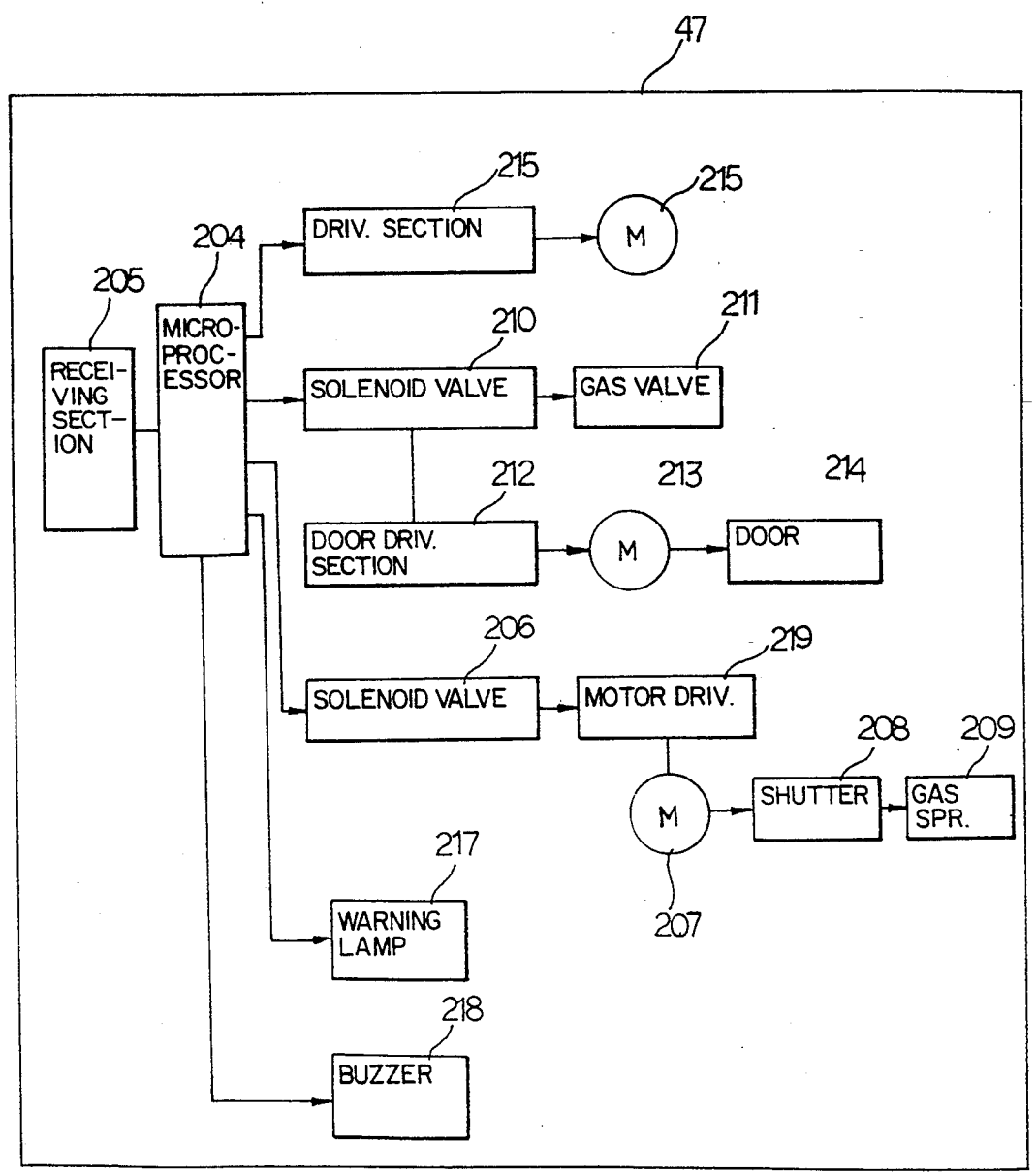

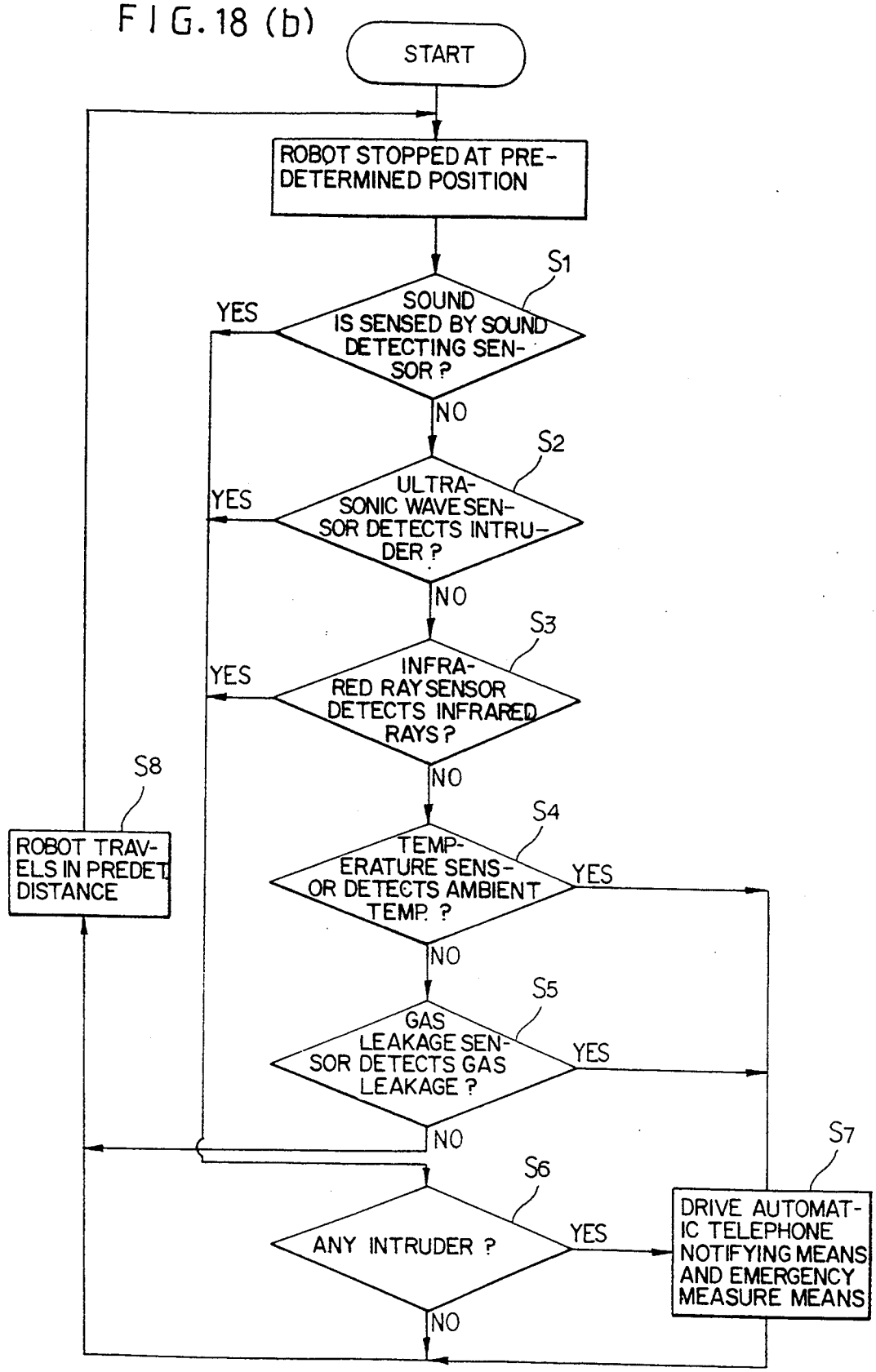

MOBILE DETECTION SYSTEM

This is a continuation-in-part application of the parent application, Ser. No. 07/789,187, filed Nov. 5, 1991, which was a continuation-in-part application of Ser. No. 07/727,630, filed Jul. 10, 1991, now abandoned.

BACKGROUND OF THE INVENTION

FIELD OF THE INVENTION

The present invention relates to a mobile detection system and, more particularly, to a mobile detection system in which the presence of an abnormal condition, such as a fire or an intruder, in a monitoring region of space or the like, is communicated externally via a wired or wireless communication system, thereby performing fire and crime preventive functions.

Recently, in apartments and single-family homes, security control systems have been used which include one or more of a fire alarm, burglar alarm, gas leak alarm, sound detection alarm and the like. Such home security control systems, however, lose their effectiveness when the resident leaves the house, or in multiple residence dwellings where an abnormal condition could arise in any one of the individual residences.

In the event that such an emergency situation occurs in any one of the individual residences or that a fire occurs or that an intruder is detected, conventional home security control systems are designed to inform automatically a central control room of the abnormal condition. The application of such a system, however, requires a number of cables, and as a result, much time and labor is required to install the wiring. Consequently, installation becomes expensive, especially when installing the system in existing structures. In the case of collective residences, when the security administrator is absent for some reason, such as patrolling the premises and the like, detection of an abnormal condition and reporting thereof are delayed and, as a result, the reporting of an abnormal condition to the police or fire officials is delayed. Furthermore, there have also been problems associated with notifying an occupant when he or she is away from home. In particular, it is impossible for the conventional system to immediately notify the occupant in such a case.

Likewise, conventional home security control systems require that gas detecting sensors be located adjacent to gas pipe lines within a kitchen, which are more likely to leak, and that intruder detecting sensors or sound detecting sensors be located at doors or windows through which an intruder is expected to enter the interior of the house. Because conventional home security systems require the use of sensors in a variety of locations, the associated wiring work is excessively complicated and can be rather unsightly. An additional problem associated with conventional house security systems relates to the wiring itself. In particular, the wiring (or the power supply line) can be cut in advance by the intruder or a third party from the outside other than the occupant to render the security system inoperable.

SUMMARY OF THE INVENTION

It is, therefore, an object of the present invention to solve the aforementioned problems by providing a rapid mobile detection system having a fire alarm, burglar alarm, gas leakage alarm, sound detecting alarm and the like, which needs no wiring work in and out of the house, and what's more, which is inexpensive to install as well as inexpensive to manufacture.

Another object of the present invention is to provide a mobile detection system having a drive apparatus for movement in which a fire and burglar preventive action can be executed while travelling. When a fire or a burglar is detected, the abnormal condition is reported via a wired or wireless communication method, to a police station, fire station or central monitoring unit.

In order to accomplish the above-described objects, the present invention comprises: a microcomputer for discriminating a generation of an abnormal state arising within a monitoring region of space and controlling a state in which a robot is to move; a drive operating system controlled by the microcomputer and having a driving means which provides forward and reverse driving power and a steering means which alters a running direction in which the robot is to move; navigation means for emitting an object detection signal and simultaneously receiving the signal reflected from the object so that the object adjacent to the monitoring region of space can be detected and the signal representing the object detection can be output to the microcomputer; abnormal condition detection means for detecting the generation of an abnormal state within the monitoring region of space to thereby output to the microcomputer; communication means for transmitting the signal representing the generation of an abnormal state detected at the abnormal condition detection means to the exterior; and a robot on which all of the above means are mounted, and which is movably controlled by the microcomputer for execution of the detecting function.

Further, an automatic telephone notifying means is supplemented to the mobile detection system in accordance with the present invention in order to report automatically, after signals are received from the communication means in the robot, to the police station, fire station or central monitoring unit that an intruder, a fire and other ambient abnormal conditions occurred. Furthermore, emergency measure means is included in the present invention to minimize damage by taking emergency measures after signals related to abnormal conditions are received from the communication means constituted in the robot.

The present invention further comprises a monitor which can listen to a sound generated from the monitoring region of space via a wireless communication method after signals transmitted from the communication means installed on the robot are received, and a remote control means which controls the robot for remotely commanding an operation from a predetermined distance. The foregoing and other objects as well as advantages of the present invention will become clear by way of the following description of the invention with reference to the accompanying drawings.

Throughout the drawings, like reference numerals and symbols are used for designation of like or equivalent parts or portions for simplicity of illustration and explanation.

BRIEF DESCRIPTION OF THE DRAWINGS

FIG. 1 is a schematic diagram illustrating a mobile detection system in accordance with the present invention.

FIG. 4 (b) is a sectional view of the drive operating system for indicating the structure in a partial extraction.

FIG. 9(b) is a flow chart illustrating an operating sequence of the faulty surface detecting device.

FIG. 12(a) is a detailed circuit diagram of a signal transmitting and receiving interface of mobile object detecting means, utilizing the ultrasonic waves in accordance with the present invention.

FIG. 17(c) is a flow chart illustrating an operating sequence of FIG. 17(a).

FIG. 18(a) is a detailed block diagram of emergency measure means in accordance with the present invention.

FIG. 18(b) is a flow chart illustrating the operating sequence of FIG. 18(a).

DETAILED DESCRIPTION OF THE PREFERRED EMBODIMENTS

Figure 2A:
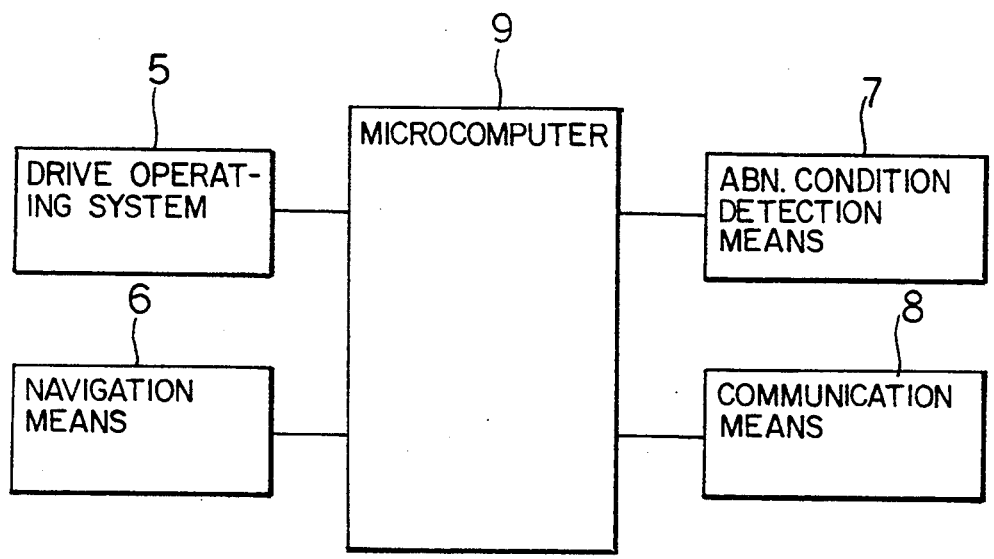
FIG. 2(a) is a block diagram illustrating the functions of the robot as depicted in FIG. 1.

Hereinafter, preferred embodiments of the present invention will be described in detail with reference to the accompanying drawings.

FIG. 1 is a schematic diagram illustrating the overall structure of a mobile detection system according to a preferred embodiment of the present invention. In particular, a reference numeral 1 illustrates a robot comprising a drive operating system travelling within a region of space for performing crime and fire preventive monitoring functions. The mobile detection system in accordance with the present invention comprises, in addition to the robot 1, an automatic telephone notifying means 2 which receives signals related to the occurrence of an abnormal condition transmitted from the robot 1. The telephone notifying means identifies automatically an emergency state within the monitoring region to an authorized user who has gone out, a police station, a fire station or a central monitoring unit.

The mobile detection system further comprises a remote controller 3 for remotely commanding the operation of the robot 1 from a predetermined distance and a monitor 4, carried by the user, for receiving and listening to sounds from the monitoring region of the robot 1. The monitor 4 uses a wireless communication method. The system also includes an emergency measure means 47 for receiving the signals related to an emergency state generated within the monitoring area, for taking an emergency measure, and minimizing damage thereof.

In the foregoing, the automatic telephone notifying means 2 is provided with an automatic telephone dialing function which automatically calls the police station, fire station or central monitoring unit in response to a signal received from the robot 1. Additionally, the telephone notifying means 2 is provided with a telephone receiving function which activates the robot 1 accordingly as the user activates the device remotely through a telephone call. The automatic telephone notifying means 2 is illustrated as a wired telephone system in the drawing. However, it can be constructed as a wireless telephone system.

Hereinafter, an overall construction of the robot will be described. FIG. 2(a) is a block diagram illustrating the construction of the robot depicted in FIG. 1. The robot 1 comprises a drive operating system 5 having a driving means and a steering means, such that the robot 5 itself can perform crime and fire preventive monitoring functions by travelling in the room.

Furthermore, the robot 1 is provided with a navigation device 6 for emitting ultrasonic waves and simultaneously receiving the reflected waves in order to detect objects. When a material object is detected ahead of the advancing robot, the robot makes a detour and continues to perform circumferential operation within the monitoring region of space. A plurality of sensors comprising an abnormal condition detection means 7 are provided, through which abnormal conditions occurring around the robot can be detected. These detectors enable the robot i to detect, in the monitoring region of space, fires, the presence or absence of intruders, gas leaks, sounds, variations in ambient temperature, infrared rays emitted from human bodies and the like. The drive operating system 5, navigation device 6, abnormal condition detection means 7 and communication means 8 are connected to a microcomputer, which controls respective functions thereof.

Next, the structure and operation of the robot 1 will be described generally with reference to FIG. 2(b). There is provided a microcomputer 9 functioning as a control means for the robot 1 which operates in response to the control of the microcomputer 9 which analyses the ambient condition within the monitoring region of space and discriminates the condition thereof for control of the drive operating system 5 and communication means 8, for which detection signals from a plurality of sensors are received. The microcomputer 9 is connected with a pair of left and right drop sensors 10 and 11 which detect a stepped or pitted portion of the floor surface through respective interfaces 12 and 13.

Based on the detecting operations of these sensors 10 and 11, the microcomputer 9 controllably drives the robot to prevent the robot 1 from falling or overturning. A driving condition detecting sensor 14, which detects whether or not the robot 1 is driving, is connected to the microcomputer 9 through an interface 15. In response to the detecting operation of the sensor 14, the microcomputer 9 discriminates whether or not the robot 1 is moving. The driving condition detecting sensor 14 is attached to a powerless wheel 16 (FIG. 1) and is detached from the drive operating system 5. The driving condition detecting sensor detects whether or not the robot 1 is normally moving when the drive operating system 5 is operating.

A speed detecting sensor 17 which detects a driving speed is also connected to the microcomputer 9 to calculate the driving speed of the robot 1. The microcomputer 9 analyzes a detected signal from the speed detecting sensor 17. In response to an approach to an obstacle, the microcomputer 9 decreases the driving speed of the robot 1, and in the event that no material objects (including animate objects) are blocking the robot's path, the microcomputer 9 accelerates the driving speed of the robot 1 to thereby evaluate a speed variation. The detection of obstacles in the path of the robot 1 is executed by a navigation means 6 connected to the microcomputer 9. Namely, a field coil 22 is activated by the microcomputer 9 which supplies a control signal to a driving circuit 21 in the navigation means 6. The field coil 22 activates an ultrasonic converter 23 that encompasses approximately a 180 degree arc in front of the robot 1. In this location, the microcomputer 9 outputs oscillating pulses to the ultrasonic converter 23 through a buffer 24 to thereby enable the ultrasonic converter 23 to emit ultrasonic waves. Waves emitted from the converter 23 are in turn reflected back to, and received by, the ultrasonic converter 23. The reflective waves are output to the microcomputer 9 through a synchronous amplifier 25 and a detection filter 26, so that the microcomputer 9 is able to discriminate the presence or absence of obstacles. The navigation means 6 thus constructed and endorsed to the Applicant of the present invention is discussed further in U.S. Pat. No. 5,079,752, which is incorporated herein by reference. Thus, the detailed construction and operation in relation to this navigation means will be omitted from the present specification.

When a material object (including an animate object) is located on the driving path of the robot 1, a steering direction of the robot is changed. To control steering, a steering detection sensor 19 for detecting a steering condition of the robot 1 is connected to the microcomputer 9 through an interface 20.

As explained in the foregoing, the plurality of sensors 10, 11, 14, 17 and 19 emit ultrasonic waves, so that the ambient condition of the robot 1 is detected along with material objects existing on the driving path of the robot 1. The microcomputer 9 analyzes the signals from these sensors to control the drive operating system 5. The drive operating system 5 is connected to the microcomputer 9. The drive operating system 5 comprises a driving motor 31 and a steering motor 32 as a main power source. The motors 31 and 32 are connected to the microcomputer 9 by way of respective motor driving circuits 33 and 34 to control the rotating directions and speeds of respective motors 31 and 32 in accordance with the control of the microcomputer 9. Accordingly, when the drop sensors 10 and 11 detect a faulty surface on the driving path while the robot 1 executes a forward operation, the microcomputer 9 controls the motor driving circuit 33 to stop an operation of the driving motor 31. Thus, the robot ceases to operate. Thereafter, the driving motor 33 is caused to rotate reversely, so that the robot 1 moves backward to steer away from the faulty surface of the driving path. When a material object is detected on the driving path by the operation of navigation means 6 during the activation of the robot 1, the microcomputer 9 executes forward or reverse rotation of the steering motor 32 by way of the motor driving circuit 34. This forward and reverse rotation allows the robot 1 to make a detour in a direction where there is no material object 5. The steered state of the robot 1 is detected by the steering detection sensor 19.

The microcomputer 9 is also connected to an abnormal condition detection means 7 comprising a plurality of sensors for detection of abnormal conditions, such as fires and intruders within the monitoring region. The sensors connected to the microcomputer 9 in accordance with the present invention are set forth below.

The microcomputer 9 is connected, through an interface 36, to an ultrasonic sensor 35 which emits ultrasonic waves and simultaneously receives reflected waves to thereby detect movement of material objects (including an animate object). The microcomputer 9 is also connected, through an interface 38, to an infrared sensor 37 which is also capable of receiving the infrared rays produced by a human body to achieve the detection of displacement of material objects including persons. The robot 1 moves around within the monitoring region of space to detect sounds, gas leaks, ambient temperature, and smoke particles for prevention of fires. The microcomputer is provided with a sound detecting sensor 39, a temperature sensor 40, an ionization sensor 41 and a gas leak sensor 42 respectively connected to interfaces 43, 44, 45 and 46. The microcomputer 9 analyses the signals detected from the abnormal condition detection means 7 to evaluate the detection of displacement of an intruder or the occurrence of a fire whereby a series of actions related to the occurrence of an emergency condition are executed. The detected condition is notified to the outside through the automatic telephone notifying means 2 or temporary measures are taken through emergency measure means 47. The microcomputer comprises, as a means to provide external notice of the abnormal conditions, communication means 8 having a transmitter 48 which transits signals related to the detection of abnormal conditions via a wireless communication method and a receiver 49 which receives control signals transmitted from the outside.

Figure 3A:
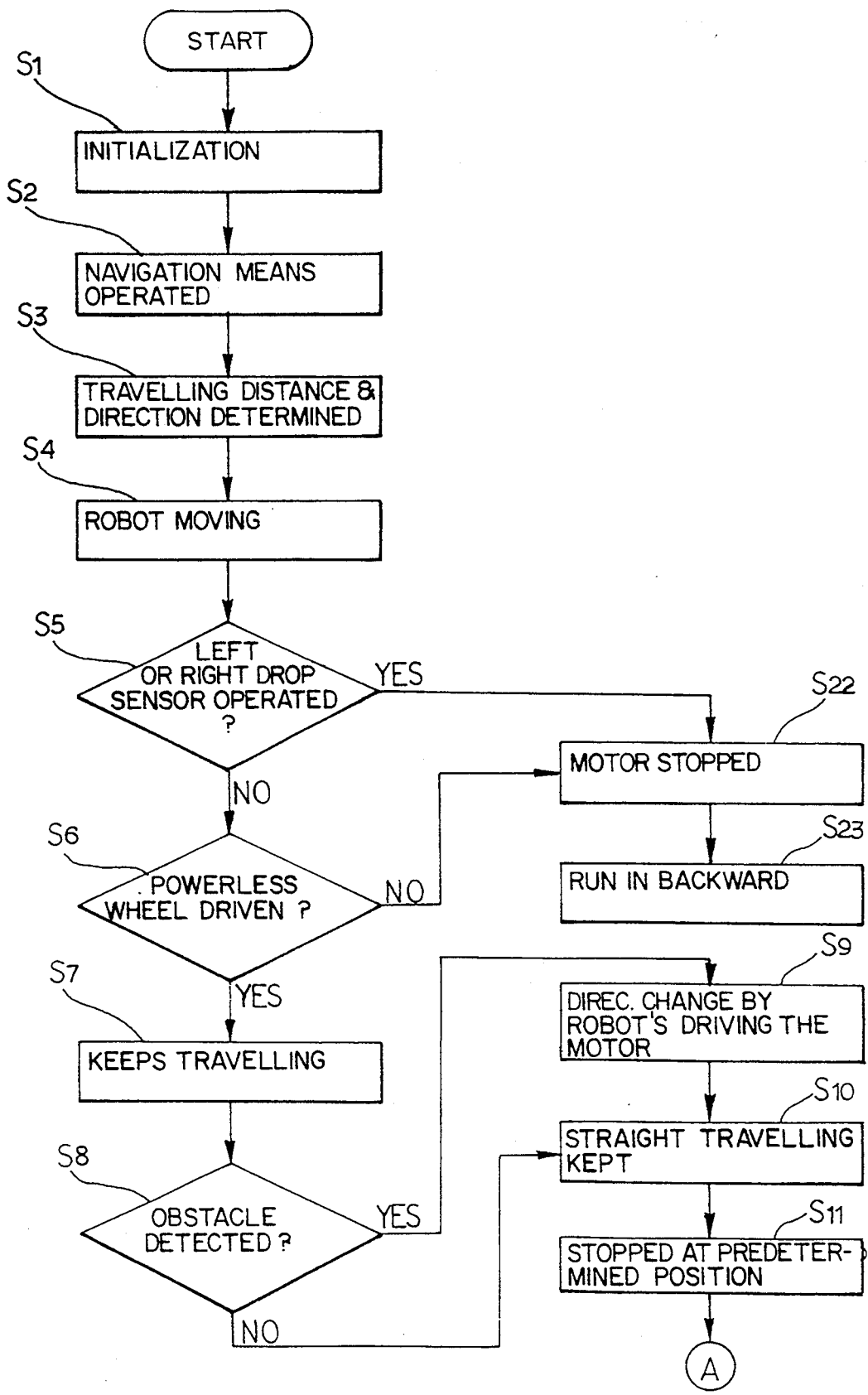
FIGS. 3(a) and (b) are flow charts illustrating an overall operation of the mobile detection system in accordance with the present invention.

Next, the overall operating sequence of the mobile detection system will be described in detail with reference to the flow charts illustrated in FIGS. 3(a) and 3(b). In FIG. 3(a) and FIG. 3(b), the letter S indicates the step, N shows No and Y demonstrates Yes. As depicted in the figures, the user presses a keyboard 50 mounted onto the robot 1 to provide a command to the robot 1. Thereafter, the robot 1 is set to an initial value at step S1 and is in an operational state. Then the flow advances to step S2 to drive navigation means 6. Next, flow proceeds to step S3, and a determination is made as to a distance to a material object (including an animate object) and a direction for a detour by comparatively analyzing an obstacle detection signal detected by navigation means 6 within the microcomputer 9. The flow then advances to step S4 to drive a driving motor 31 and a steering motor 32 in response to the determination of the distance and direction, so that the robot 1 is caused to detour around the obstacle and move forward.

While the robot 1 is moving, the robot operates the right and left drop sensors 10 and 11 and a driving condition detecting sensor 14 for detecting a driving state of a powerless wheel 16. It also operates the speed detecting sensor 17 for detecting a moving speed of the robot 1 by detecting an inverse electromotive force of the driving motor 31 and the steering detection sensor 19. Next, the flow proceeds to step S5, and a determination is made as to whether one of the drop sensors 10 or 11 has been activated. For example, when the left drop sensor 10 is activated (illustrated in the Figure as YES), the microcomputer 9 outputs to a motor driving circuit 33 a control signal which stops the forward rotation of the driving motor 31, and thereby causes the driving motor 31 and the rotation of the powerless wheel 16 to stop at step S22. At this point, after a determination is made as to whether or not the robot 1 is stopped in response to the signal detected from the driving condition detecting'sensor 14 mounted on the powerless wheel 16, the flow advances to step S23. At step S23, the driving motor 31 is rotated in a reverse direction to provide backward movement for a predetermined distance, after which a return is made to step S3 to thereby repeat the operations subsequent to step S3.

On the other hand, when drop sensors 10 and 11 are not activated during step S5, the flow proceeds to step 6. At step 6, a determination is made as to whether the powerless wheel 16 is being operated in response to the signal detected from the driving condition detection sensor 14, namely, a determination is made as to the driving state of the robot. In the case of NO, the flow advances to step S22, and as mentioned in the foregoing, the operations subsequent to step S22 are repeated. In the case of Yes during step S6, the flow advances to step S7 to continue forward rotation of the driving motor 31, to maintain forward movement of the robot 1.

Next, a determination is made, during step S8, as to whether obstacles have been found by the navigation means 6. In the event of Yes, a signal indicative of such a find is provided to the microcomputer 9. Then, the flow proceeds to step S9, and the microcomputer 9 outputs the control signal to the motor driving circuit 34 to thereby drive the steering motor 32, so that the movement direction of the robot 1 is changed. Thereafter, the robot is caused to maintain a straight movement in the new direction in response to a signal indicative of the distance measurement of the navigation system 6 during step S10. In step Sll, the microcomputer 9 stops the operation of the driving motor 31 the moment a revolution of the driving motor 31 matches an already-programmed revolution to thereby stop the robot 1 at a location where an intruder, fire, sound, ambient temperature and the like are easily detected.

Meanwhile, in the event that an obstacle has not been found (in the case of NO), the flow advances to step S10, so that the robot performs step 10 and step 11 progressively as depicted above. Thereafter, while the robot 1 is stopped, the flow proceeds to step S13, which is performed by emitting an ultrasonic wave from an ultrasonic sensor 35 and then by receiving the reflective wave thereof. Thus, a moving intruder and heat waves such as infrared rays produced by a human body can be detected. Then the flow proceeds to step S14 to determine whether or not there is an intruder present. When no intruder is detected (in the case of NO), the flow advances to step S15 to thereby detect a sound produced within the monitoring region of space by utilizing a sound detecting sensor 39.

However, when it is determined at step S14 that an intruder is present (in the case of YES), the flow proceeds to step S16, and the microcomputer 9 drives communication means 8 to transmit a signal related to the presence of the intruder to automatic telephone notifying means 2. Next, at step S17, as the automatic telephone notifying means 2 is driven by said transmitted signal, an authorized user who happens to be away is alerted simultaneously with an automatically dialed police station, fire station or central monitoring unit such as a control room to the fact that an abnormal condition has risen within the interior of the house or the office. Accordingly, the operation cycle of the mobile detection system is terminated.

On the other hand, if a sound is detected during step S15 (in the case of YES), the flow advances to step S16, and the steps subsequent to step S16 are, as mentioned above, executed. At step S15, when no sound is detected, the flow proceeds to step S18 to discriminate the ambient temperatures by utilizing a temperature sensor 40. If there is no sudden ambient temperature change during step S18, then step S19 is executed to detect smoke particles in response to the ionization sensor 41. At this moment, if smoke particles are detected (in the case of YES), the flow proceeds to step S16, and the steps subsequent to step S16 are executed as mentioned above. In the case of NO, the monitoring operation of one cycle for the mobile detection system is terminated. In the event that the sudden ambient temperature change is detected by the temperature sensor 30 at step S18, the flow advances to step S16 and the steps subsequent to step S16 are repeated.

In the textual description of the flow chart illustrated in FIG. 3, the left drop sensor 10 is only used to exemplify step S5 because the right drop sensor 11 operates in the same manner as the left side counterpart.

Next, a configuration of the robot systems schematically depicted in the foregoing will be described in detail with reference to the figures of the preferred embodiments.

Figure 4A:
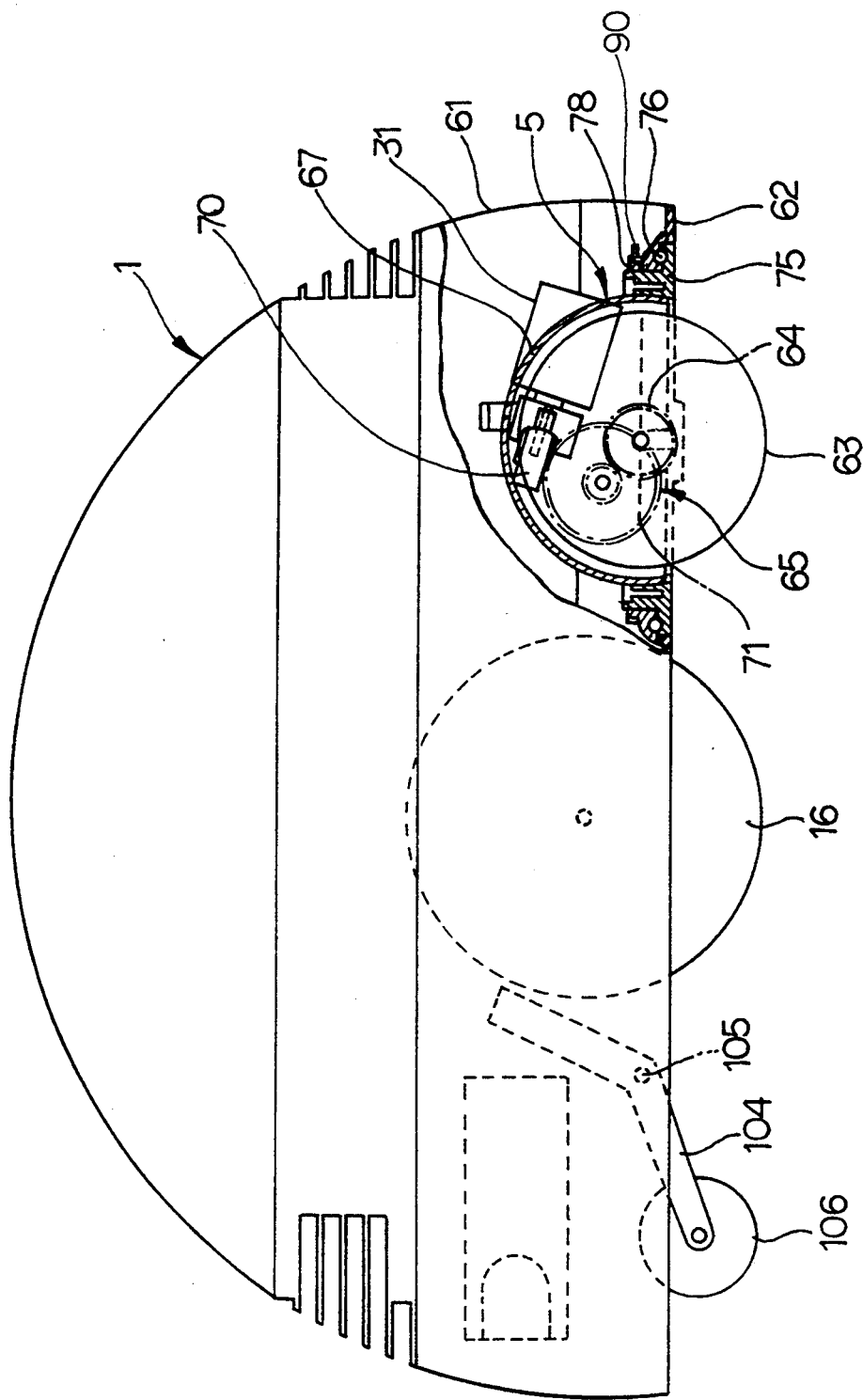
FIG. 4(a) is a diagram illustrating the present mobile detection system.
Figure 4C:
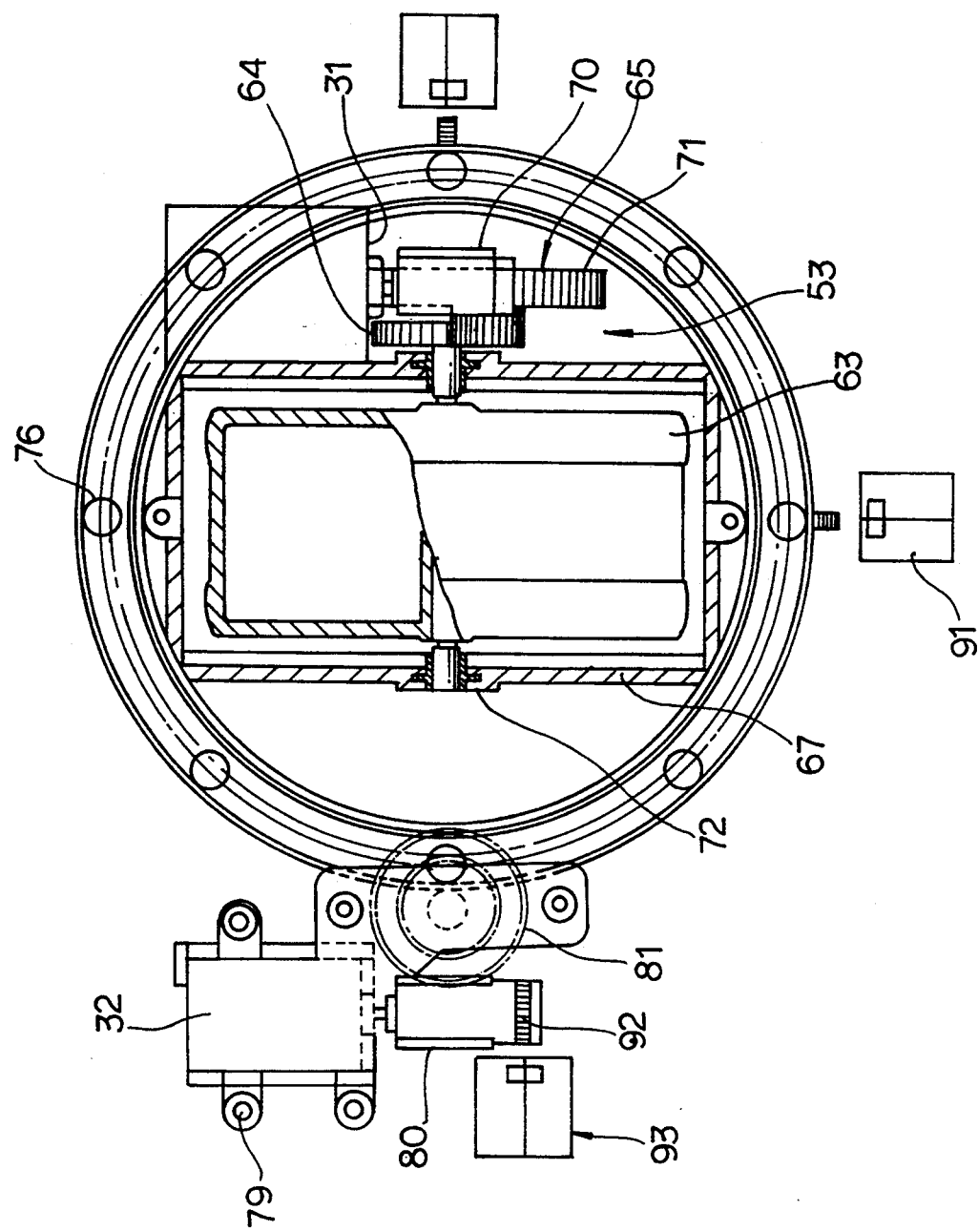
FIG. 4(c) is a plan view of FIG. 4(b).

FIGS. 4(a)-4(c) show a configuration wherein the drive operating system 5 is installed to the robot in accordance with the present invention. The drive operating system has a driving means 53 and a steering means 54. The driving means includes a driving motor 21 and a roller-shaped wheel member 63, between which a speed changing member 65 is disposed to deliver a decelerated speed of the driving motor 31 to the wheel member 63. The driving means 53 is provided on a rotary disc member 75 of the steering means 54 fastened at the bottom plate 62 to provide travelling power to the robot 1. The robot 1 provided with the drive operating system 5 at the bottom comprises a truck body 61 of semispherical shape and a bottom plate 62 of spherical disc member, which is assembled to the trunk body 61 as an releasable fitting. The wheel member 63 comprising a driving means is connected to the speed changing member 65 on the bottom plate 62 with a spur gear 64 as a medium and the speed changing member 65 is in turn connected to a driving motor 31 of the driving source.

The drive operating system comprising the driving means and steering means is shown in detail in FIG. 4(b). The wheel member 63, mounted integrally with a shaft 66, is connected to a fixing frame 67 to which the shaft 66 gives support and the fixing frame 67 is fastened to a setting member 69 by a fastening device 68. The setting member 69 includes a driving motor 31. The shaft of the driving motor includes a worm 70, which in turn is meshed with a worm gear 71, rotatably mounted to a shaft 72 that is transversely mounted between the fixing frame 67 and the setting member 69. A spur gear 45 is meshed with the worm gear 71 and is integrally mounted to the shaft 66 which is fixed to the wheel member 63. Accordingly, when the driving motor 31 is driven, the driving power thereof is transferred to the wheel member 63 through the worm gear 71 and spur gear 64 to thereby move the robot 1.

On the other hand, the steering means includes a rotary disc member 75 of circular plate form mounted on the driving means. The rotary disc member 75 is assembled by inserting it upward from the bottom of the bottom plate 62 mounted on an opening member. A plurality of roller bearings 76 are interposed between the rotary disc member 75 and the bottom plate 62, so that the rotary disc member 75 executes smooth and free rotation. The rotary disc member 75 includes a peripheral wall portion 77 extending upward. The peripheral wall portion 77 passes over the bottom plate 62 and protrudes into the interior of trunk body 61. A ring shaped sun gear 78 is inserted outside the top end of the peripheral wall portion 77. The sun gear 78 acts as a base for setting and holding the rotary disc member 75 to the bottom plate 62, and cooperates with the speed changing member to be connected to the steering motor 32. When the steering motor 32 rotates, the rotary disc member 75 is forced to rotate on the bottom plate 62.

The steering motor 32 is fixed by a setting member 79 at an appropriate location outside the circumference of the rotary disc member 75 at a position adjoining, as near as possible to, the rotary disc member. The speed changing member includes a worm 80 mounted on a shaft of the steering motor 32 and a worm gear 81 meshed with the worm 80. The worm gear 81 is rotatably fixed to a shaft 82 which is mounted vertically between the bottom plate 62 and the setting member 79, so that the worm gear 81 can execute smooth and free rotation. The worm gear 81 is meshed with the sun gear 78 of the rotary disc member 75 to transfer the driving power transferred from the steering motor to the rotary disc member 75. The driving means is mounted on the rotary disc member 75 and by rotating disc member 75, the running direction of the moving robot 1 can be steered.

When a power source of the robot 1 is turned off, the driving means 53 mounted on the rotary disc member 75 is stopped in a state facing toward a desired direction. When the robot 1 is re-activated, it is necessary to return to an absolute position facing the facade of the robot 1, namely, the position at which the driving means 53 is set up. In other words, an encoder 93 (to be explained later) is used by the microcomputer 9 as a means to discriminate the present travelling direction of the robot 1. The microcomputer 9 calculates the number of pulses detected from the encoder 93 to discriminate a steering angle of the robot 1, so that the steering angle should be fixed at "0", which shows the absolute position of the robot 1. Accordingly, when the power source of the robot 1 is re-activated, the steering motor 32 is driven, so that the driving means 53 mounted on the rotary disc member 75 is moved to the absolute position. At this moment, a steering detection sensor 19 detects a state where the driving means 53 has moved to the absolute position.

The steering detection sensor 19, as depicted in FIG. 4(c), is constructed with a magnetic member 90 fixed at an appropriate location outside the circumference of the sun gear 78 integrally mounted with the rotary disc member 75. The magnetic member 90 and a magnetic field sensing element 91 constitute a pair. The magnetic member 90 provides power to the robot 1 and simultaneously is rotated along with the rotary disc member 75 when the rotary disc member 75 is rotated by the driving steering motor 32. The moment the magnetic member 90 is fixed in a direction perpendicular to the magnetic field sensing element 91, the microcomputer 9 which receives an output signal of the magnetic field sensing element 91 discriminates that the driving means 53 is disposed on an absolute position. Thereafter, the microcomputer 9 controls the steering motor 32 to drive the rotary disc member 75 mounted with the driving means 53, so that the robot is turned in the desired direction. The steering detection sensor 19 is fixed in anticipation of the running direction of the robot 1, and as an example, if fixed to a position facing the steering motor 32.

In the present invention, the steering detection sensor 19 is not restricted to a sensor which detects an initial absolute position of the driving means 53 during the operation of the robot 1. By additionally mounting more than one steering detection sensor 19 at an appropriate position of the rotary disc member 75, the microcomputer 9 is made to discriminate the steering position of the robot 1 under a state the robot is moving. In the foregoing, on one end of the shaft of the steering motor 32, as illustrated in FIG. 4(c), there is provided a circular magnet 92 and at a place near the circular magnet 92 there is an encoder 93 which is connected to the microcomputer 9 to measure the steering angle of the robot 1. The encoder 93, when the rotating shaft of the steering motor 32 rotates, detects a variation of magnetic field of the circular magnet 92 mounted on the rotating shaft and dispatches the signal detected therefrom to the microcomputer 9 to measure the revolution of the shaft of the motor. Because the revolution of the shaft of the motor represents a displacement of the rotary disc member 75, the steering angle and direction of the robot 1 are discriminated by the microcomputer 9.

Next, the overall operation of the drive operating system will be described. When an initial starting signal is given, the microcomputer 9 contained within the trunk body 61 is made to drive the driving motor 31. The driving power is transferred to the wheel member 63 through the speed changing member 65 to thereby run the robot 1. At this moment, the robot is made to face a front running direction. When the robot receives an obstacle detection signal from navigation means 6, the microcomputer 9 receives this detected signal and at the same time, outputs a driving signal to the steering motor 32 of the steering means 54 to perform steering. The steering of the robot 1 is adjusted to avoid the obstruction recognized in the navigation means 6.

In more detail, the microcomputer 9 selects a side where no obstacle is sensed when an obstacle is detected in front of the robot 1. The robot causes the steering motor 32 to turn the direction of the robot. At the same time, the rotary disc member 75 which receives the driving power of the steering motor 32 is turned in the desired direction. The steering state of the robot 1 is discriminated by the microcomputer 9 in response to the detected signal of the encoder 93 which measures the revolution of the steering motor 32. On the other hand, when the rotary disc member 75 is turned by a predetermined angle to reach a predetermined direction, the steering detection sensor 19 detects the steering state. The detection sensor 19 finishes the steering operation of the robot in response to the detected signal and returns the rotary disc member 75 back to the original position to steer the robot to a desired direction. Accordingly, in coping with the ambient conditions thus occurring irregularly, the robot is made to perform monitoring functions continuously within the guarded area.

Next, a reverse rotation of the driving motor 31 will be described. When the left drop sensor 10 or right drop sensor 11 detects a faulty surface in the path of the robot 1 a current in the driving motor 31 is shut off by the microcomputer 9 to stop the robot 1 temporarily. Thereafter, the microcomputer controls the motor driving circuit 33 to provide a reverse direction current to the motor 31, so that the driving motor 31 can be reversely rotated. This reversal causes the robot 1 to move backward for a predetermined distance so that the robot 1 can move away from the faulty surface.

Figure 5B:
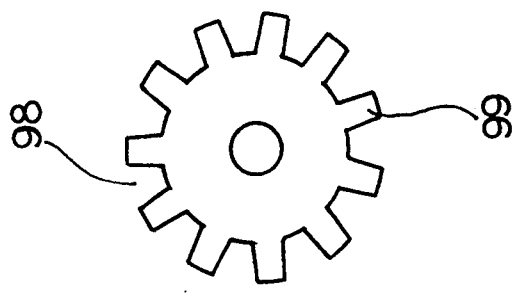
FIG. 5(b) is a frontal view of an optical value disc in accordance with the present invention.
Figure 5A:
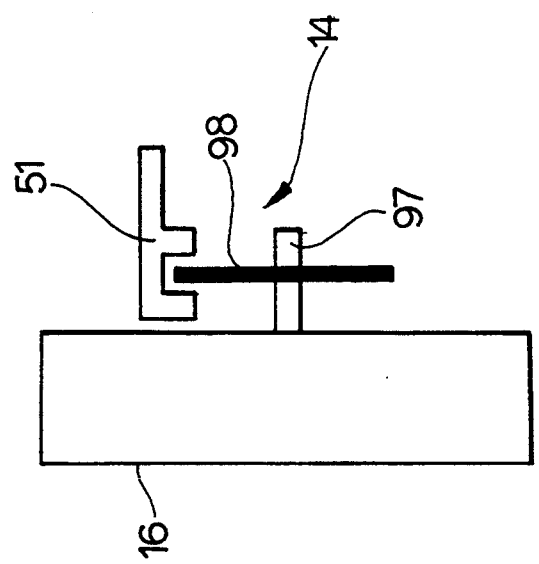
FIG. 5(a) is a block diagram of driving condition detection means.

Next, a driving condition detecting means which detects the movement condition of the robot 1 will be described. FIGS. 5(a) and 5(b) illustrate construction of driving condition detection means and an optical value disc. In the present invention, the movement condition of the robot is detected in a rotating condition of the powerless wheel 16. A driving condition detecting sensor 14 is mounted on the powerless wheel 16 as illustrated in FIG. 5

The driving condition detecting means is constructed in such a way that, on a rotational shaft of the powerless wheel 16, there is provided an extension shaft 97 of a predetermined length, on which the optical value disc 98 is mounted. On the circumferential surface of the disc there is formed an extensive concave-shaped optical value member 99, near which a driving condition detection element 51 such as a photocoupler is located. Accordingly, when the powerless wheel 16 is rotated by the operation of the robot 1 to rotate the optical value disc 98, the disc 98 repeats an operation of passing or shutting off the light emitted by the optical value member 99 from the driving condition detecting element 51 of the driving condition detecting sensor 14. Thus, a light value signal outputted from the driving condition detecting sensor 14 is detected by the microcomputer 9 to discriminate the movement of the robot 1.

Next, the motor driving circuit comprising the driving means of the drive operating system will be described. Referring to FIG. (6)a, there is shown the motor driving circuit 33 which controls the driving motor 31. The driving circuit 33 comprises a motor forward-driving portion 85 for driving the motor forwardly, a motor reverse-driving portion 86 for driving the motor reversely and a rotational direction setting portion 87 for setting the rotational direction of the motor, namely for setting the forward and reverse directions of the motor. The motor forward-driving portion 85 includes a first transistor TR1 having a base connected to a forward-driving signal output terminal MF of the microcomputer 9 and an emitter connected to ground. Second and third transistors TR2 and TR3 each have a base commonly connected to a collector of the transistor TR1 through a resistor R10 and an emitter connected to a power supply of 24 V, respectively.

The motor reverse-driving portion 86 includes a fourth transistor TR4 having a collector connected to a reverse-driving signal output terminal MB of the microcomputer 9 and a base connected to the forward-driving signal output terminal MF. A fifth transistor TR5 has a base connected to a collector of the fourth transistor TR4 and an emitter connected to the emitter of the transistor TR4. Sixth and seventh transistors TR6 and TR7 each have a base commonly connected to a collector of the fifth transistor TR5 and each have an emitter connected to the power supply of 24 V.

The rotational direction setting portion 87 includes a first MOSFET MT1 having a gate commonly connected with its source through a resistor R6, connected to the collector of the seventh transistor TR7. A second MOSFET MT2 has a gate connected to the collector of the third transistor TR3, a drain connected to the source of the first MOSFET MT1 and a source connected to ground GND along with the emitter of the transistors TR4 and TR5. A first inductor L1 has one end connected to a node between the source and drain of the first and second MOSFET MT1 and MT2, and its other end connected to a terminal "—" of the motor thereby delaying the rotational speed of the motor.

A third MOSFET MT3 has one gate connected to the source through a resistor R7 and connected to the collector of the transistor TR2. A fourth MOSFET MT4 has a drain connected to a source of the MOSFET MT3, a gate connected to the collector of the transistor TR6 and a source connected to the ground. A second inductor L2 has one end connected to a node between the source and drain of the third and fourth MOSFET MT3 and MT4 and its other end connected to a terminal "+" of the motor. When the robot system moves forward, a high level output signal is output by the microcomputer 9 through the forward-driving signal output terminal MF. In response to a high level output signal, the transistors TR1 and TR2 are rendered conductive.

When the transistor TR4 is rendered conductive, it forms a ground potential on the reverse-driving signal output terminal MB thereby preventing an erroneous operation of the motor reverse-driving portion 86. Accordingly, as the transistor TR1 is rendered conductive, the bases of the transistors TR1 and TR2 are decreased in potential to thereby render the transistors TR3 and TR3 conductive. As a result, the third MOSFET MT3 connected to the collector of the transistor TR2 is rendered conductive and the second MOSFET MT2 is also rendered conductive. Therefore, a current flows via a current loop which is formed by the following circuit, the 24 V power (BAT) voltage-MOSFET MT3-inductor L2-motor(M)-inductor L1-MOSFET MT2-ground GND. Thus, the motor M rotates forward so that the robot 1 moves forward.

When moving forward and when the drop sensors 10 and 11 detect the faulty surface in the path, the microcomputer 9 cuts off a current in the forward-driving output terminal MF to stop the robot 1 temporarily and move the robot 1 backward. In other words, a high level output signal is output to the motor driving circuit 33 through the reverse-driving signal output terminal MB by the microcomputer 9. Thus, the transistor TR5 is rendered conductive and transistors TR6 and TR7 are also rendered conductive. Thereafter the MOSFET MT1 is rendered conductive and the MOSFET MT4 is also rendered conductive. As a result, current flows via a current loop which is formed by the circuit 24 V power (BAT) supply-MOSFET (MT1)- inductor (L1)- motor (M)-MOSFET (MT4)-inductor (L2), so that the motor rotates reversely and the robot moves backward.

Figure 6A:
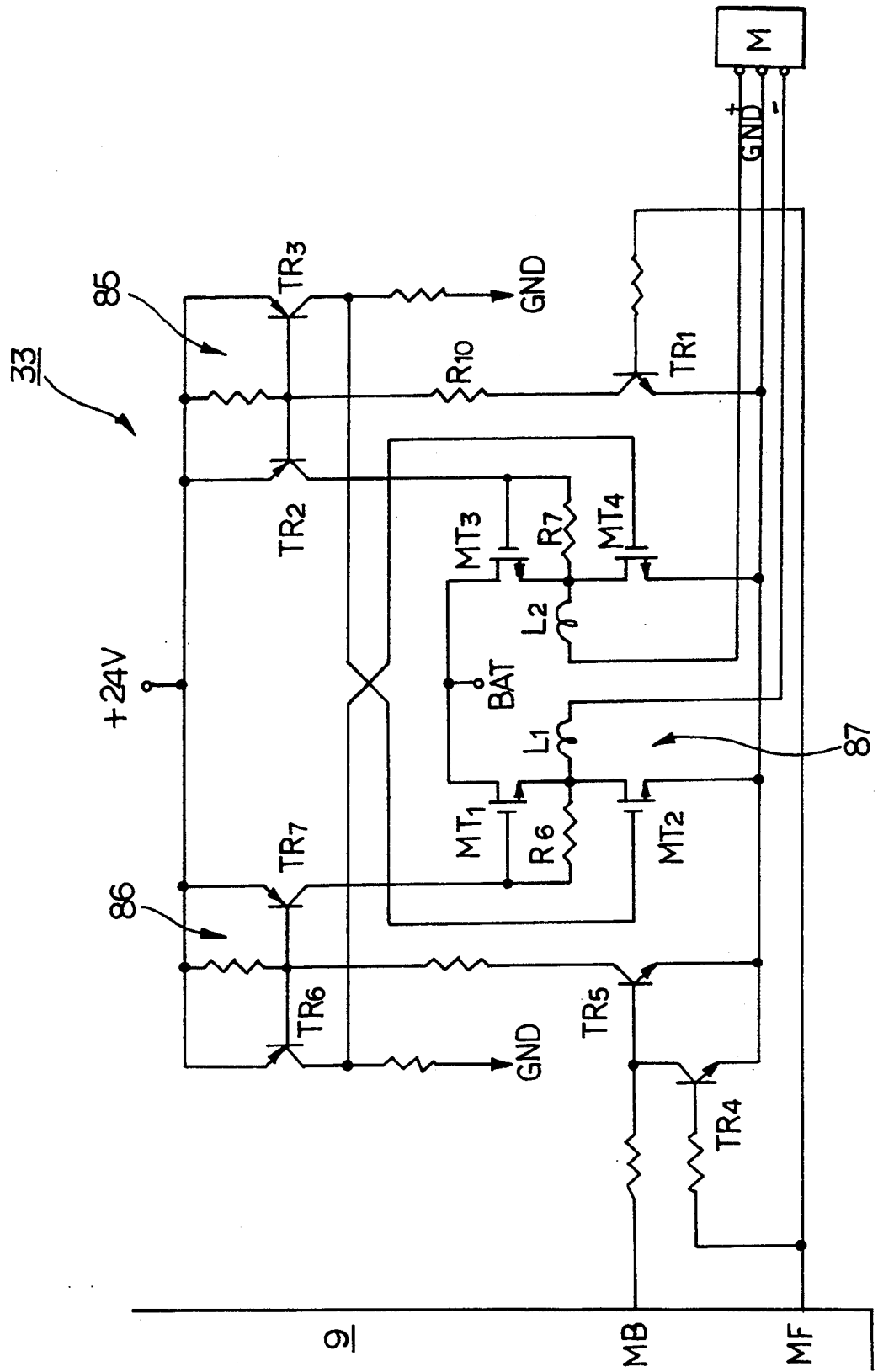
FIG. 6(a) is a drive circuit diagram of a driving motor formed on a drive operating system in accordance with the present invention.
Figure 6B:
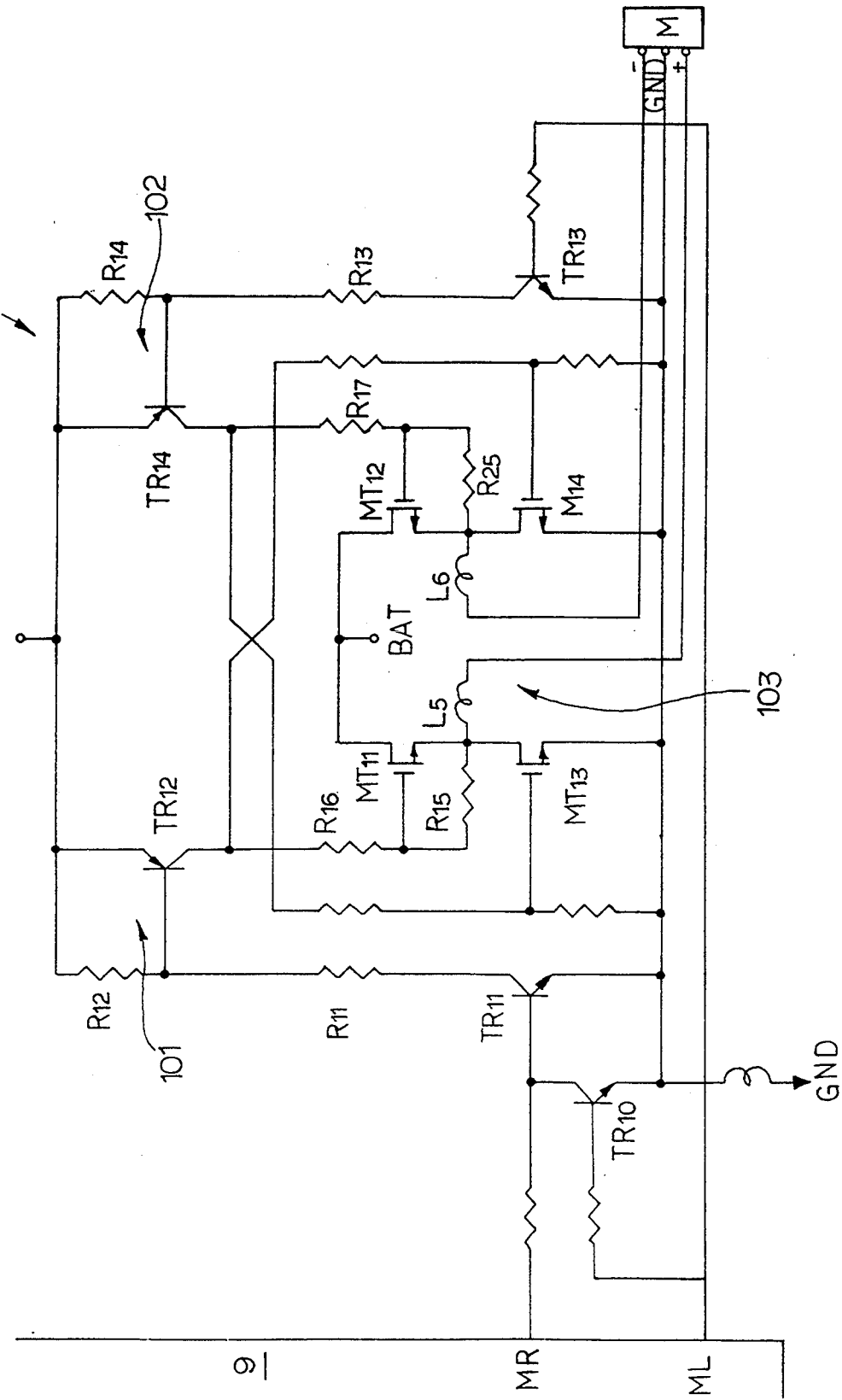
FIG. 6 (b) is a drive circuit diagram of a steering motor formed on a drive operating system in accordance with the present invention.

Next, a motor driving circuit comprising a steering means for the drive operating system will be described below with reference to FIG. 6(b). As shown in FIG. 6(b), a steering motor driving circuit 34 includes a right steering driving portion 101 which comprises a switching transistor TR10 having a collector connected to a right steering signal output terminal MR of the microcomputer 9 and a base connected to a left steering signal output terminal ML. A first transistor TR11 has a base connected to a collector side of the transistor TR10 and an emitter connected to ground. A second transistor TR12 has a base connected to a node between resistors R11 and R12 and to the collector of the first transistor TR11 and an emitter connected to the 24 V power supply.

The steering motor driving circuit 34 also includes a left steering driving portion 102 which comprises a third transistor TR13 having a base connected to a left steering driving signal output terminal ML of the microcomputer 9 and an emitter connected to ground. A fourth transistor TR14 has a base connected to a node between resistors R13 and R14 and connected to the collector of the transistor TR13 and an emitter connected to the power supply.

A direction setting portion 103 comprises a first MOSFET M11 having a gate connected to a source thereof through a resistor R15 and to the collector of the transistor TR12 through a resistor R16, and a drain connected to the 24 V power supply. A second MOSFET MT12 has a gate connected to a source thereof through a resistor R17 and to the collector of the transistor TR14 and a drain connected to the 24 V power supply. A second MOSFET MT12 has a gate connected to a source thereof through a resistor R17 and to the collector of the transistor TR14 and a drain connected to the 24 V power supply at BAT. Third and fourth MOSFETs MT13 and MT14 each have a gate connected to the collector of the transistors TR12 and TR14 respectively, a drain connected to the sources of the MOSFETs MT11 and MT12 and a source connected to ground, respectively. An inductor 25 has one end connected to the source of the MOSFET MT11 and its other end connected to a positive terminal "+" of the motor. An inductor L6 has one end connected to the source of the MOSFET MT12 and its other end connected to a negative terminal "−" of the motor.

If an obstacle is sensed during an operation of the robot by navigation means 6, a high level output signal is supplied from the right or left steering signal output terminal MR or ML. For instance, if the left steering signal output terminal ML outputs a high level signal, the transistor TR10 is rendered conductive and the transistor TR13 is also rendered conductive. The conductivity of the transistor TR10 connects the right steering signal output terminal MR to ground, thereby preventing an erroneous operation of the right steering driving portion 101. As a result, as the transistor TR13 is rendered conductive, the base of the transistor TR14 is decreased in potential so that this transistor TR14 is also rendered conductive and thereby the MOSFETs MT12 and MT13 are rendered conductive. Accordingly, current flows through a current loop which is formed by the battery BAT (24 V)-MOSFET (M12)- inductor (L6)-motor (M)-inductor (L5)-MOSFET (MT13). Therefore, the motor so rotates that the robot is turned to the left.

Alternatively, if the right steering signal output terminal MR outputs a high level signal, the transistor TR11 is rendered conductive and then the transistor TR12 is rendered conductive, whereby the MOSFETs MT11 and MT14 are also rendered conductive. As a result, current flows through a current loop which is formed by the battery BAT (24 V)-MOSFET (MT11)- inductor (L5)-motor (M)-inductor (L6)-MOSFET (MT14), so that the steering motor 32 rotates in a reverse direction, and thus the robot is turned to the right.

Figure 7:
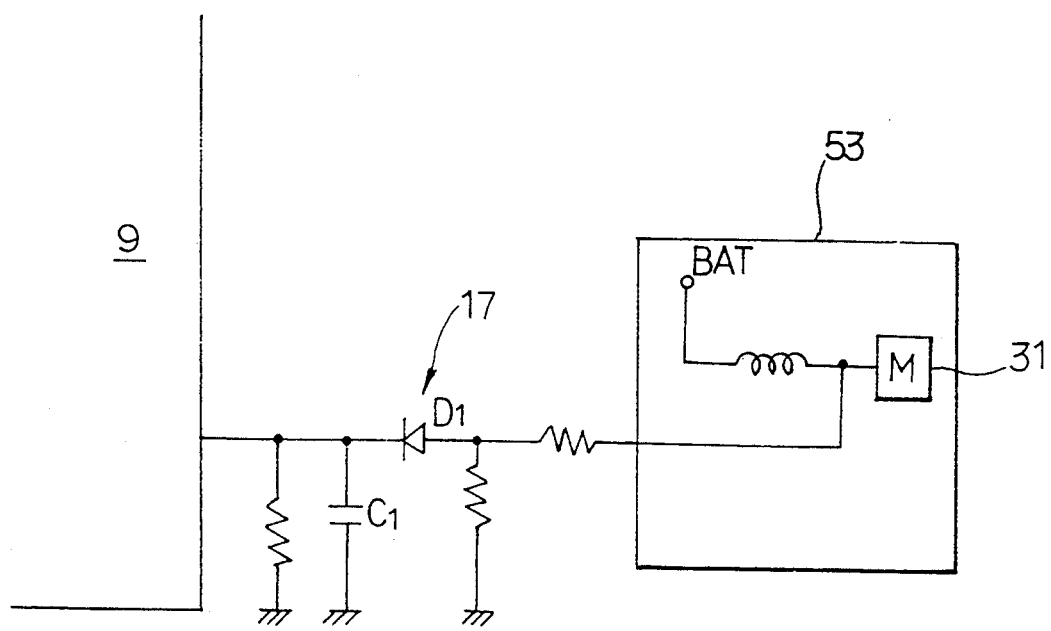
FIG. 7 is an interface circuit diagram of a speed detecting sensor.
Figure 2:
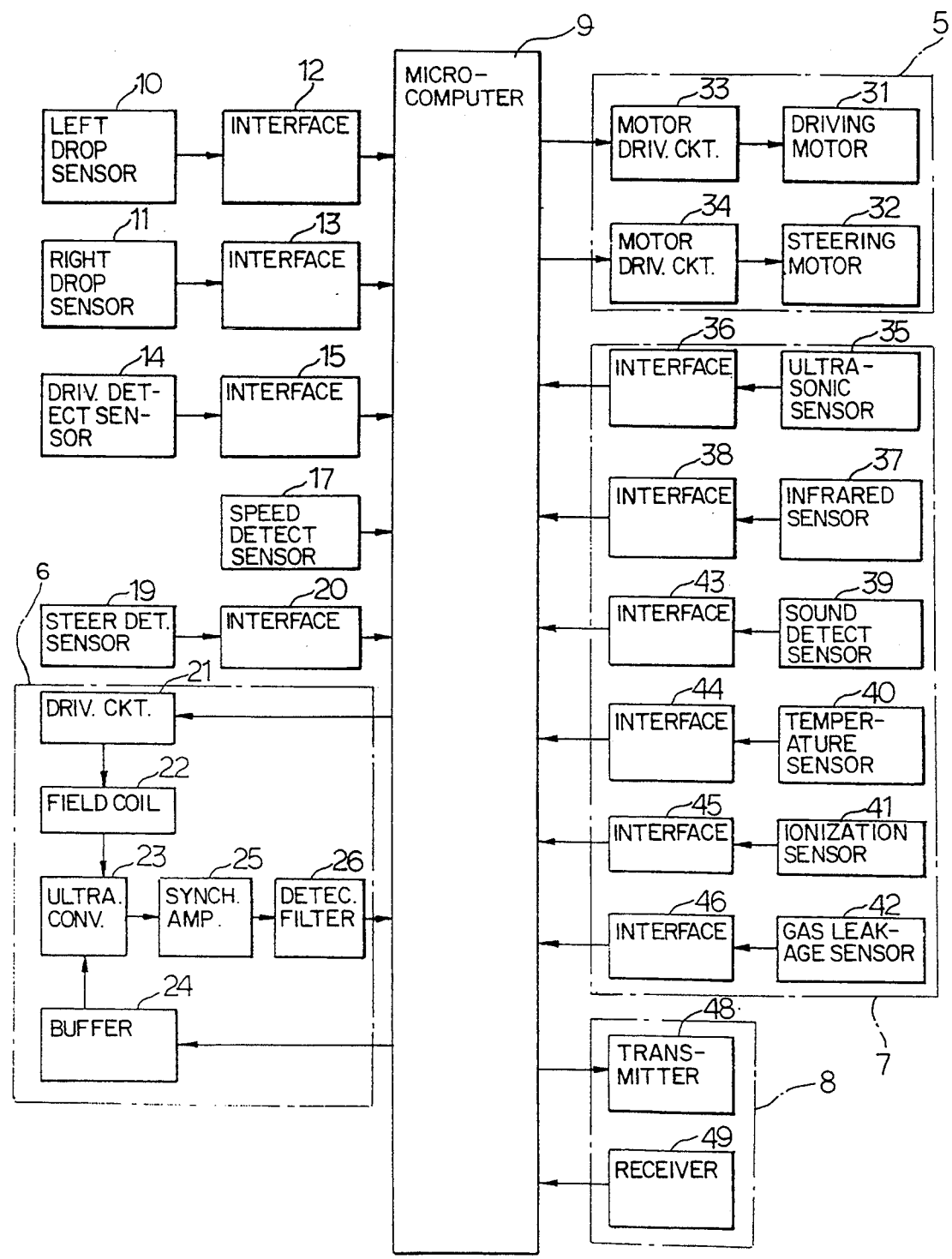
FIG. 2 (b) is a block diagram illustrating in detail each function of the robot as depicted in FIG. 2(a).

Meanwhile, an interface circuit 18 of a speed detecting sensor 17 is constructed on one of inductors L1 or L2 formed on the motor driving circuit 33, so that a driving speed of the robot can be discriminated. In other words, as shown in FIG. 7, the speed detecting sensor 17 is so constructed that an output line is drawn from a current input terminal of an inductor and is connected to a rectifying circuit which is comprised of a diode D1 and a condenser C1. The microcomputer 9 is thus connected to an output terminal of the rectifying circuit.

Accordingly, when a driving current is supplied to the inductors L1 and L2 in order to operate the robot, a current is drawn from a current input terminal of the inductor to the output terminal. The current condenses both ends of the condenser when the current flows through the condenser. The condensed potential is detected by the microcomputer 9, so that the moving speed of the robot is detected. When the condensed potential is low due to a small driving current, the speed of the robot is discriminated to be slow. When the condensed potential is high due to a large driving current, the robot is discriminated to be moving at a high speed as the motor shows a state of a normal operation.

Next, a faulty surface detecting device mounted to the bottom plate 62 of the robot will be described with reference to FIG. 8. The faulty surface detector prevents the robot 1, moving by the power of the drive operating system 5, from being overturned at a non-planar location of a driving surface.

The detecting device for obtaining the above object is constructed with balls 106 arranged at the right and left front portions of the mobile robot. Levers 104 are provided with a ball at one end and a magnet 107 at the other end, respectively. Drop sensors 10 and 11 are provided with magnet field sensing elements 108 for sensing the magnet and its magnet field in response to lever displacement. The detecting devices are provided in pairs at the right and left sides on bottom surfaces of the bottom plate 62. The levers 104 are arranged on the bottom plate 62 of the trunk body by hinge pins 105 respectively, and the sensing elements 108 are mounted on the bottom plate 62 and confront a magnet which is mounted to the other end of the lever 104.

Figure 8A:
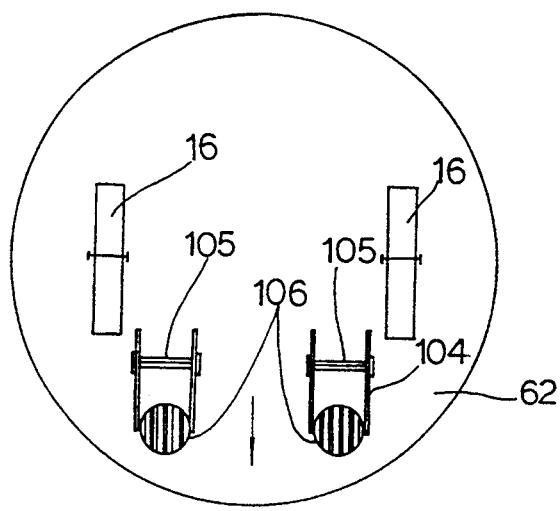
FIG. 8(a) is a plan view illustrating a preferred embodiment of the mobile robot when a faulty surface detecting device is viewed from the bottom to the top.
Figure 8B:
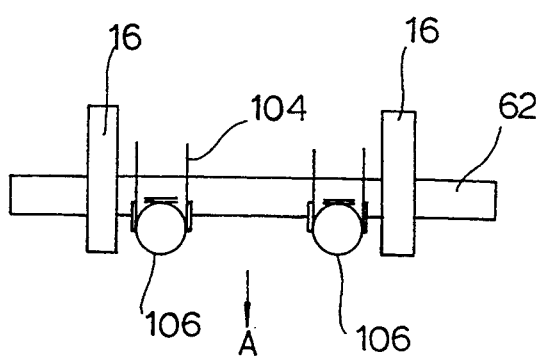
FIG. 8(b) is a front elevational view of the faulty surface detecting device.
Figure 8C:
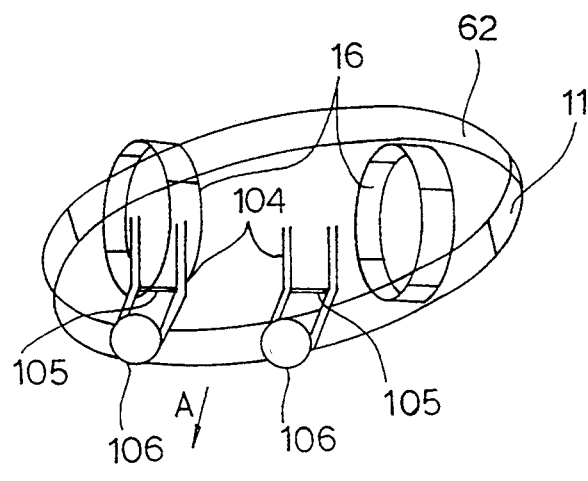
FIG. 8(c) is a schematic block diagram of the faulty surface detecting device.
Figure 8D:
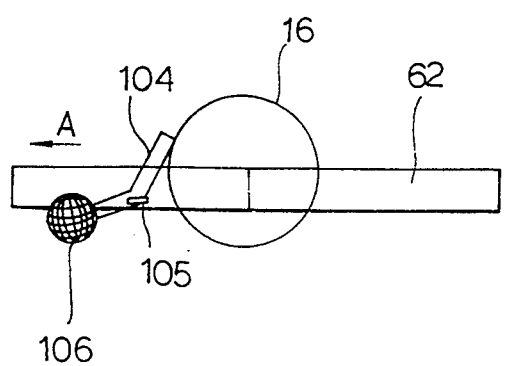
FIG. 8(d) is a side view of FIG. 8(c).
Figure 8E:
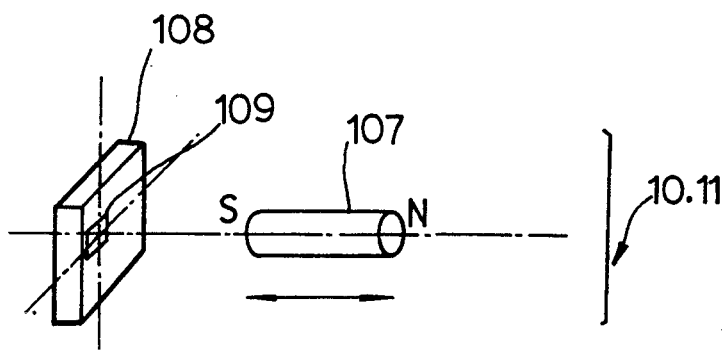
FIG. 8(e) is a schematic block diagram of a preferred embodiment of a detecting member applied to the present invention.
Figure 8F:
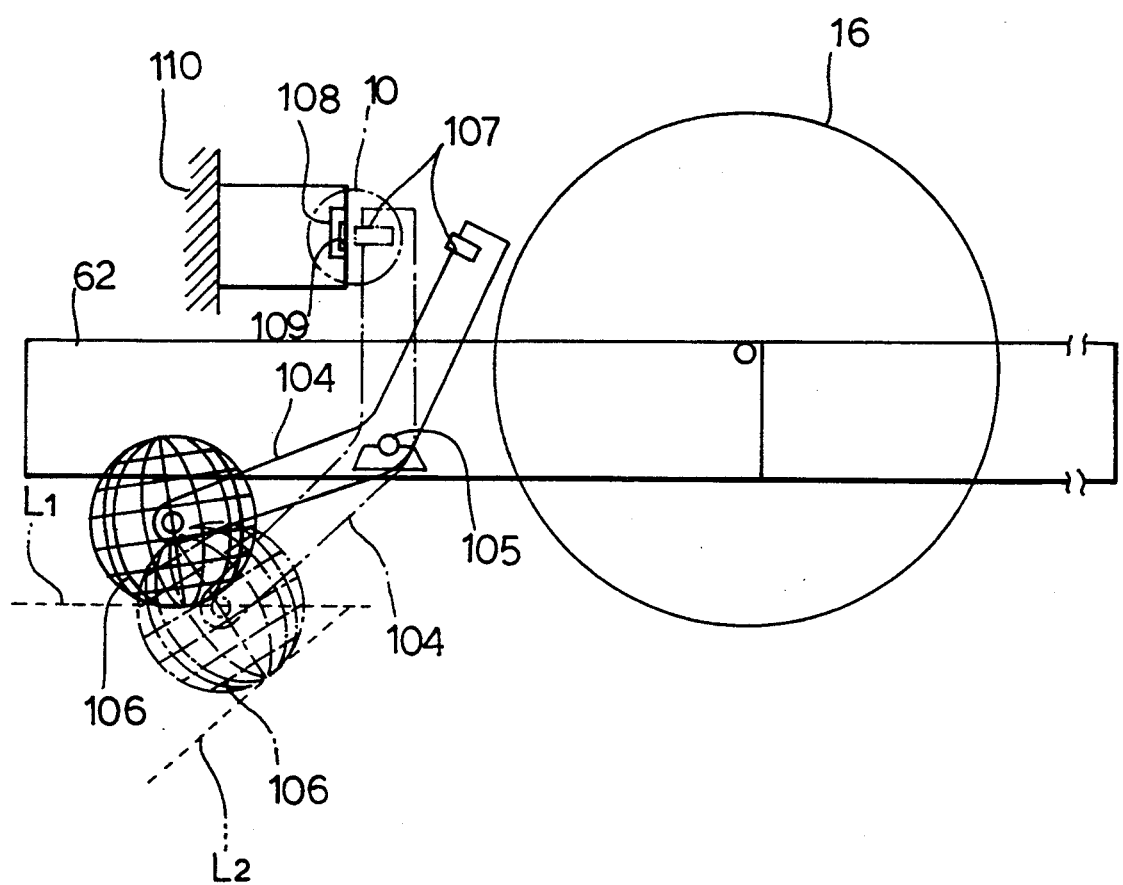
FIG. 8(f) is a drawing of an operational state illustrating an operation of the faulty surface detecting device in accordance with the present invention.
Figure 9A:
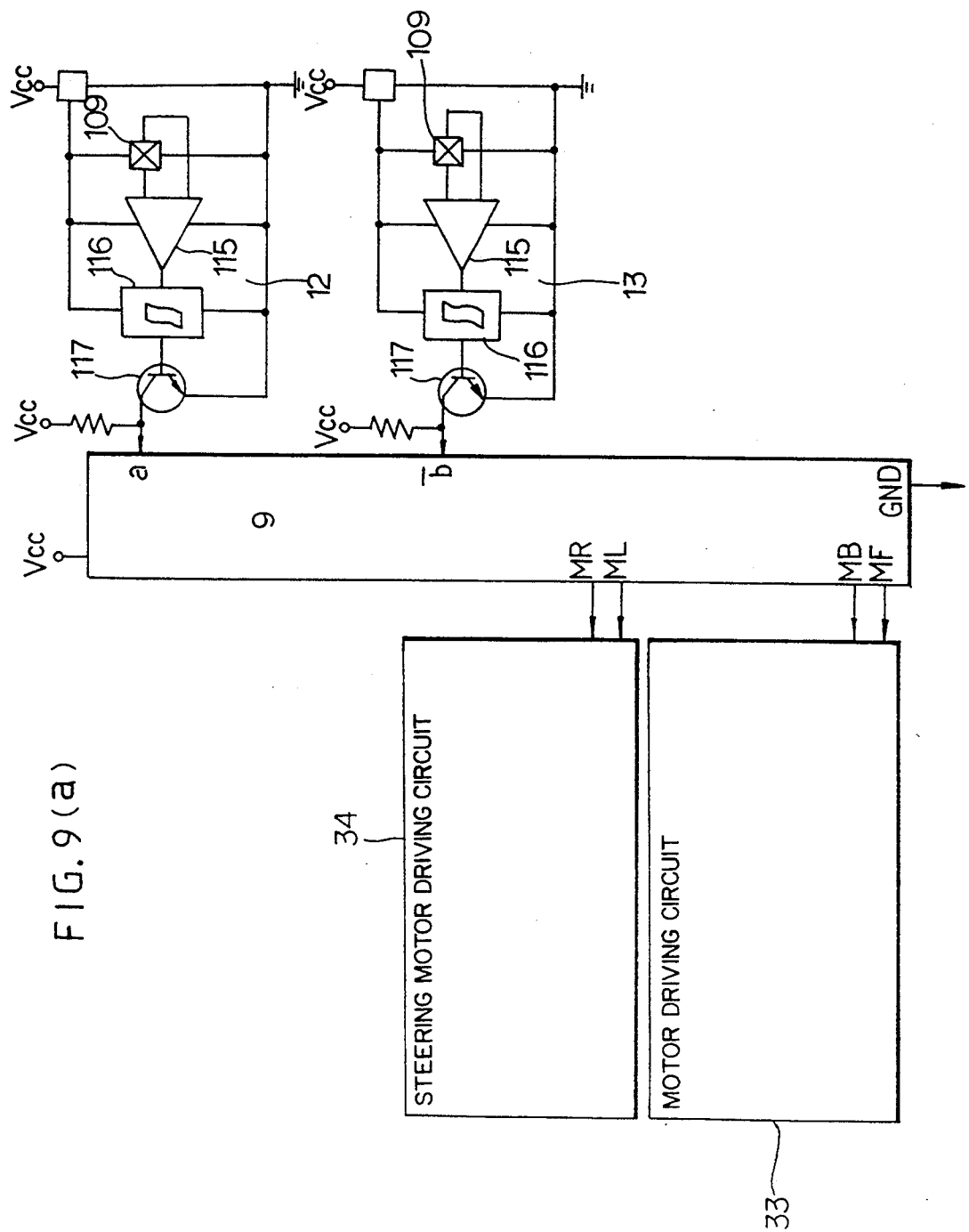
FIG. 9(a) is a detailed circuit diagram of an input and output device for a microcomputer connected with the faulty surface detecting device and the drive operating system in accordance with the present invention.

Hereinafter, a preferred embodiment of the faulty surface detecting device will be described in detail with reference to the accompanying drawings. FIGS. 8(a), (b), (c), (d) are structural diagrams schematically showing the surface detecting device of the mobile detection system according to the present invention. FIG. 8(f) is a diagram showing an operational state of the device. FIG. 9(a) is a circuit diagram for explaining a correlation operation between the interface of the drop sensor and the motor driving circuit, and FIG. 9(b) is a flow chart illustrating an operational sequence.

As shown in FIG. 8(a), on the bottom plate 62 of the robot of substantially circular shape, there are arranged two powerless wheels 16 confronting each other around the plate center. Two levers 104 are arranged on the bottom plate member between the two powerless wheels 16 so as to be able to move up and down. On each of the levers 104, the middle portion is bent at a predetermined angle, and hinge pins 105 are fixed at both ends of edges of the bent portion. At the front end of the lever 104, there is rotatably provided a ball 106 having a diameter which is substantially of the same width as that of each hinge pin 105. Accordingly, when the mobile robot advances in the direction of the arrow and when the robot reaches a stair portion or a floor drop-off whereby at least one of the right or left balls 106 falls on a faulty surface of the floor, such stair portion, drop-off or pitted portion of the surface is detected by the drop sensors 10 and 11. The sensors 10 and 11 comprise a magnet 107 and magnet field detecting elements 108 as illustrated in FIG. 8(e). The detected signal is supplied to the microcomputer 9. The robot moves backward for a moment under the control of the microcomputer 9, turns 90 degrees to the right or left, and thereafter operates so as to execute normal operation.

Next, an explanation will be described with respect to a mechanical operation of the faulty surface detecting device of the robot according to the present invention with reference to FIGS. 8(e) and 8(f). As depicted in FIG. 8(e), each drop sensor 10 and 11 include a bar-shaped permanent magnet 107 and a hall element 109 having a magnet field sensing element 108 which can be arranged on the horizontal axis of the permanent magnet 107. The magnet 107, as illustrated in FIG. 8(f), is made to operate in such a manner that the other end portion of the lever 104 with the permanent magnet therein leaves or approaches the magnetic field element 108 in response to the movement of the mobile robot. The microcomputer 9 receives a detected signal produced from the hall element 109 of the magnetic field sensing element, so that a stair portion or pitted area of the underlying surface can be detected.

That is, in FIG. 8(f), when the robot normally advances on a flat surface of horizontal extension line L1, the ball 106 and lever 104 maintain a position as shown by the solid line. However, when a stair or other drop-off L2 on the road surface occurs, the ball 106 falls down at the stair or other drop-off. Thus, the position of the ball 106 and the lever 104 are displaced as shown by the dotted line in FIG. 8(f). At the stair or drop-off, the source of the magnetic field (the magnet 107 attached to the other end portion of the lever) approaches the magnetic field sensing element 108 attached to a bracket 110 whereby a signal current detectable in the microcomputer 9 is generated from the magnetic field. Accordingly the microcomputer 9 controls the driving motor 31 to stop the advancing movement of the robot 1. The next operation is controlled by the microcomputer 9, as described hereinafter.

Next, the process by which the robot is controlled by the faulty surface detecting device is explained with reference to FIG. 9(a). When the robot reaches a place where a bad surface condition such as drop-off exists on the left side during the robot's progress, the ball 106 attached at the front left side of the robot falls down out of its usual horizontal plane under its own weight. At this moment, the lever attached to the left side ball 106 is displaced whereby the magnet 107 attached to the other end of the lever 104 approaches the hall element 109. The hall element 109 conducts a current in proportion to the magnitude of the magnetic field in response to the magnetic field which changes according to the position change of the magnet 107. A current flowing in the hall element 109 is output from a Schmitt trigger 116 through a signal amplifier 115, which turns on an output transistor 117. A low level signal is input through an input port a of the microcomputer 9.

Consequently, the microcomputer 9 judges a bad surface condition on the left side of the robot and outputs a signal which operates the backward operation of the driving motor 31 to the motor driving circuit 33 through a port MB to thereby move the robot backward by a predetermined distance. Next, the microcomputer 9 applies a driving signal to the steering motor driving circuit 34 through a port MR to turn, in the rightward direction by a 90-degree angle a rotating plate 75 attached to the steering motor 32. This turning motion prevents the robot from falling down due to the bad surface on the robot's left side.

Conversely, when the robot reaches a bad road surface condition which could cause the robot to fall down toward the right side during the robot's progress, the ball 106 mounted to the right front side of the robot falls below its usual horizontal plane under its own weight. At this moment, the lever 104 attached to the right side ball 106 is displaced whereby the magnet 107 attached to the other end of the lever 104 approaches the hall element 109. The hall element 109 conducts a current in proportion to the magnitude of the magnetic field in response to the magnetic field which changes according to a position change of said magnet 107.

At this moment, a current flowing in the hall element 109 is output from the Schmitt trigger 116 through the signal amplifier 115, which turns on the output transistor 117. Thus, a low level signal is input through an input port b of the microcomputer 9. Consequently the microcomputer judges a bad surface condition at the right side of the robot and outputs, to the motor driving circuit 33 through the port MB, a signal which initiates the backward operation of the driving motor 31 to thereby move the robot backward by a predetermine distance. Meanwhile, since the microcomputer 9 has judged that the dangerous direction for the robot is to the right, the microcomputer 9 applies a driving signal to the motor driving circuit 34 through a port ML to turn the rotary plate 75 in the leftward direction by a 90-degree angle, which prevents in advance the robot from falling due to the bad condition on the right side of the robot.

FIG. 9(b) is a flow chart illustrating the operating sequence of the faulty surface detecting device of the robot of the present invention. First, when a power supply switch of the power supply means is turned ON, at step S1, a direct current is applied whereby the robot 1 begins to operate. At step S2, the robot begins to advance in accordance with a pre-input program for execution of crime and fire prevention, moving within the monitoring region of space. Successively, at step S3, when the ball attached to the front right and left sides of the robot 1 drops at a place where the surface condition is bad, the magnet 107 attached to a top end of the lever 104 is displaced and the degree of magnetic field change is detected at the hall element 109. At this moment, the signal generated from the hall element 109 is amplified to a predetermined value at the signal amplifier of the interface. When the signal passes through the Schmitt trigger and turns on the output transistor, a low level drop signal is input to the microcomputer 9.

In this way, when the drop signal is input to the microcomputer 9, that is, in the case of YES, flow proceeds to step S4. The robot is moved back by a predetermined distance in accordance with the program established in the microcomputer 9 and the steering direction of the robot is discriminated at the steps subsequent to step S5. At step S5, when the microcomputer 9 judges that the bad surface is present to the left of the robot, flow advances to step S6, and the microcomputer 9 applies an operational signal to the steering motor driving circuit 34 through a port MR to rotate the steering motor 32 in the forward direction. Accordingly, the rotary plate 75 connected to the steering motor 32 is turned to the right by a 90-degree angle to prevent the robot in advance from falling down. Then flow returns back to step S2 for repeated execution of ensuing operations.

When at step S7 the microcomputer 9 judges that a bad surface is present at the right side R of the robot, flow proceeds to step S8, and the microcomputer 9 applies the operation signal to the steering motor driving circuit 34 through the port ML. Thus, the driving circuit 34 rotates the steering motor M reversely such that the rotary plate 75 can turn to the left by a 90-degree angle. Flow returns to step S2 and normal operation ensues. When the surface is good, at step S3 that is, when S3 yields NO, flow returns to step S2 and the robot moves in accordance with the operating program previously inputted to the microcomputer 9.

Figure 10:
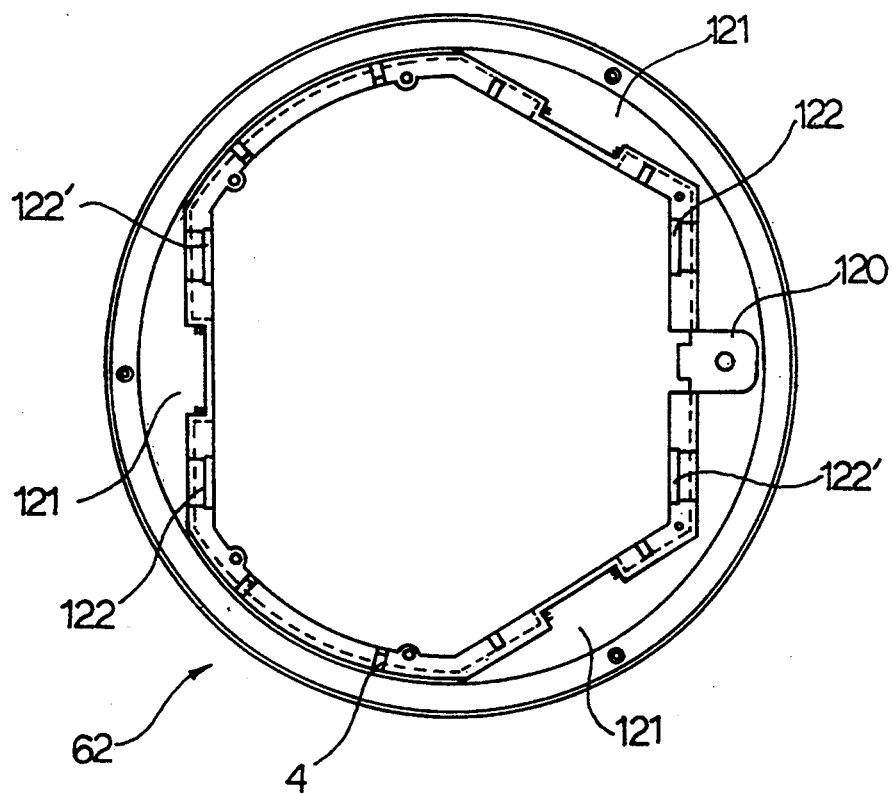
FIG. 10(a) is a plan view of a fixed member of a detecting sensor in accordance with the present invention.
FIG. 10(b) is a plan view of a fixed grille being connected on a fixed member of the detecting sensor in accordance with the present invention.
FIG. 10(c) is a partial plan view of a state in which an ultrasonic sensor for object detection is mounted.
FIG. 10(d) is a partial back view of a state in which the ultrasonic sensor for the object detection is mounted.
Figure 10:
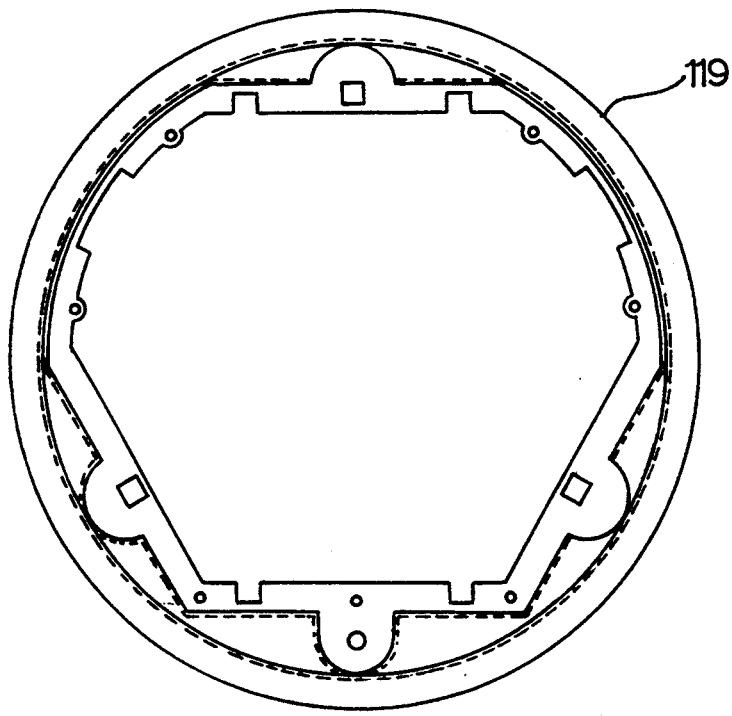
Figure 10:
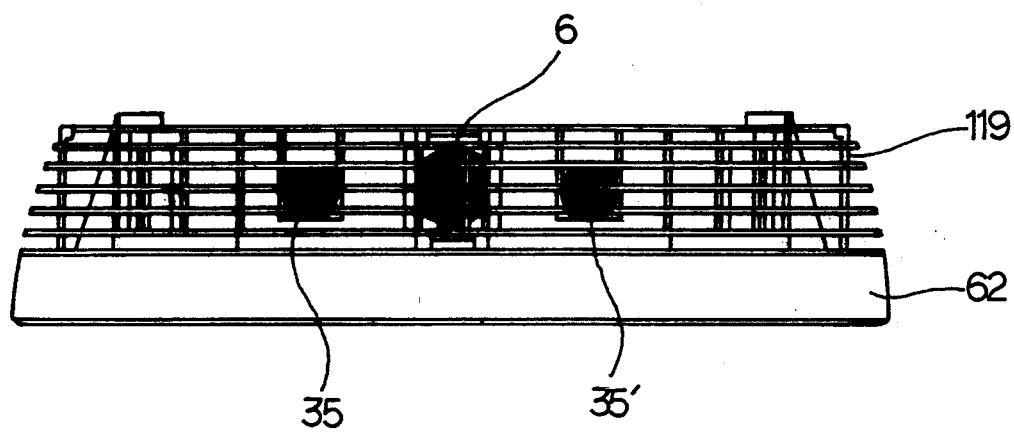
Figure 10:
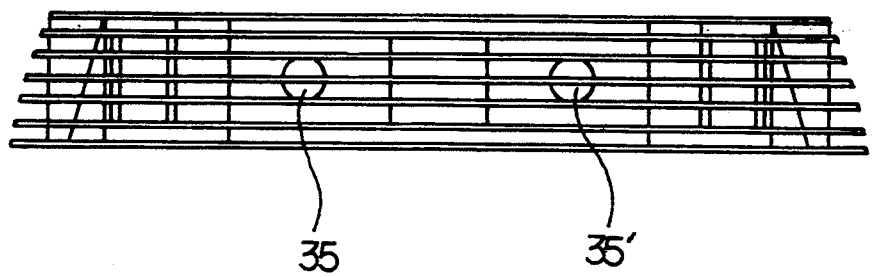

Next, a preferred embodiment of the layout of various sensors for abnormal condition detecting means 7 will be explained. FIG. 10(a) is a diagram showing the setting positions of the sensor formed on the bottom plate 62 of the robot 1, and shows a preferred embodiment of the layout of the various sensors. FIG. 10(b) shows a sensor fixing grille 119 for fixing, from above, sensor inserted into the sensor fixing portion of the bottom plate 62.

Navigation means 6, for detecting an obstacle present at a close distance, is mounted on a first sensor setting portion 120 formed on the front of the robot. An infrared ray sensor 37 for sensing infrared rays produced by a human trespasser is mounted at second sensor setting portions 121 formed on three different places at an interval of 120 degrees. Third sensor setting portions 122 and 122' are arranged at the right and left of the first sensor setting portion 120 on which one unit of an ultrasonic wave transmitting sensor 25 and an ultrasonic wave receiving sensor 35' are mounted. On the back part of the robot trunk, there is also formed third sensor setting portions 122 and 122' on which one back-facing unit of an ultrasonic wave transmitting sensor 35 and an ultrasonic wave receiving sensor 35' are mounted.

FIG. 10(c) shows part of the frontward portion of the robot trunk which illustrates how navigation means 6 and ultrasonic wave sensors 35 and 35' are mounted. FIG. 10(d) shows a part of rearward portion of the robot trunk which illustrates how a unit of ultrasonic wave transmitting sensor 35 and receiving sensor 35' are mounted. The above-described ultrasonic wave transmitting and receiving sensors 35 and 35' are fixed against positional displacement and are only directed forward.

Figure 11:
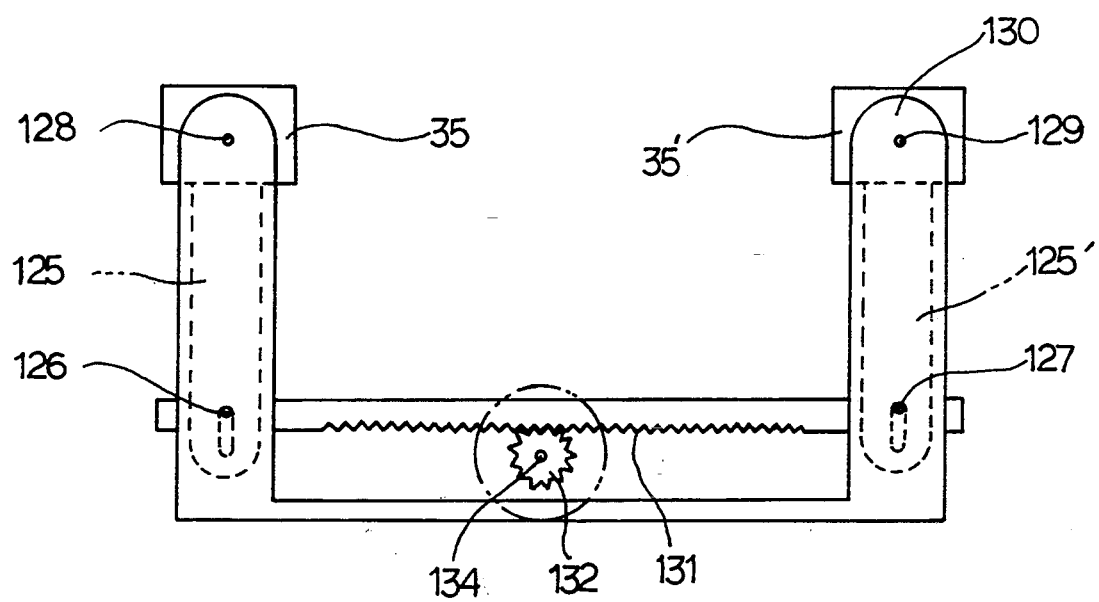
FIG. 11(a) is another embodiment of the present invention for an operation of the ultrasonic sensor.
FIG. 11(b) is a drawing for illustrating an operational state in which a set-up angle is "0" in accordance with FIG. 11(a).
FIG. 11(c) is a drawing for illustrating an operational state in which the set-up angle is "A" in accordance with FIG. 11(a).
FIG. 11(d) is a drawing for illustrating an operational state in which the set-up angle is "B" in accordance with FIG. 11(a).
Figure 11:
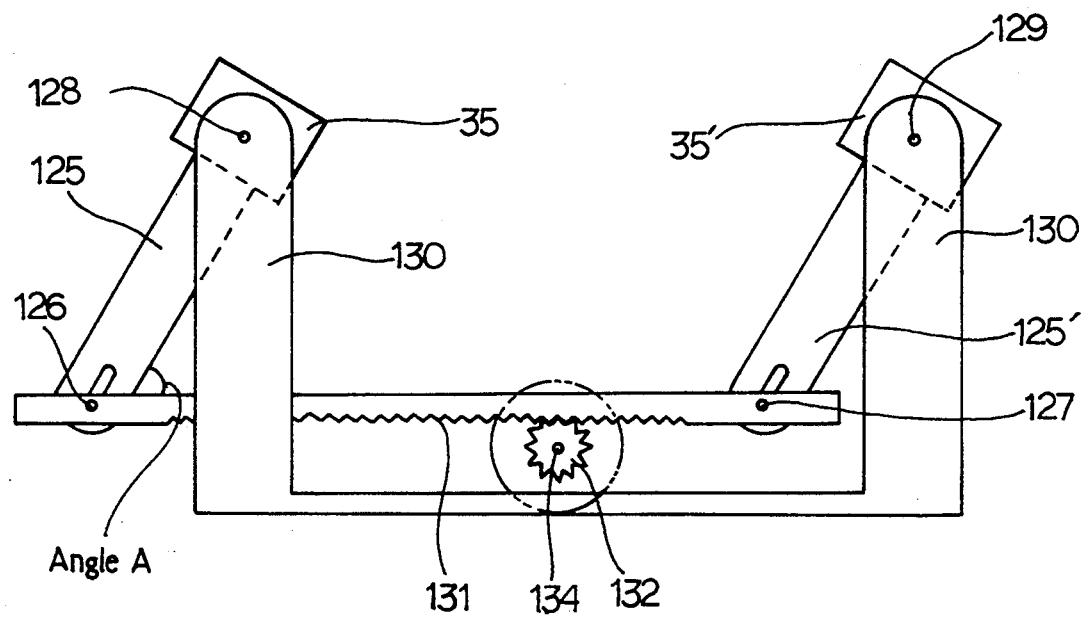
Figure 11:
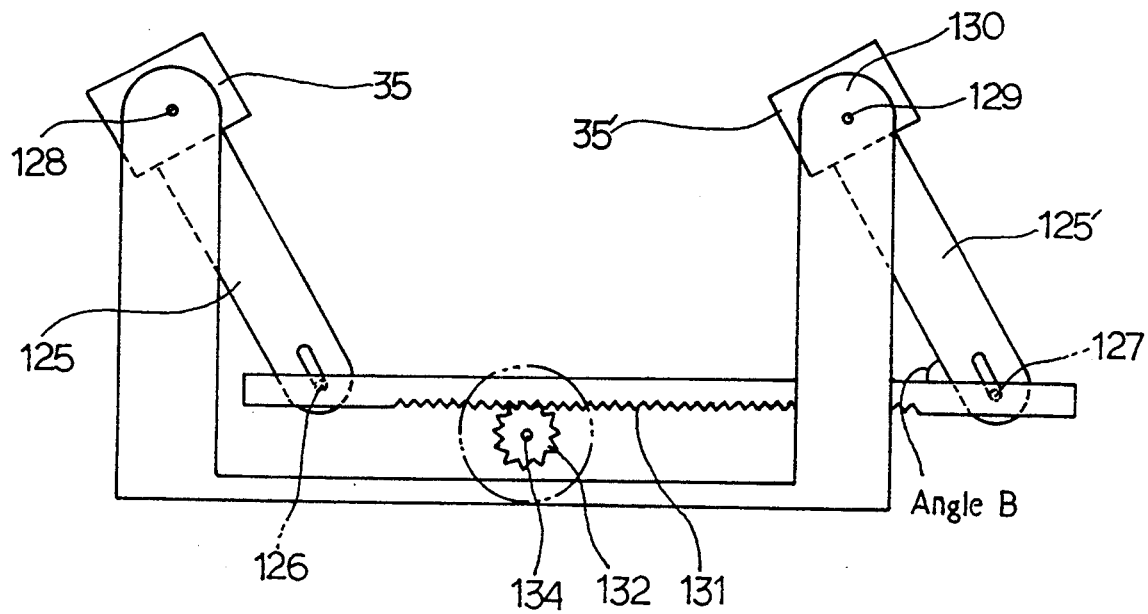

However, it is possible to employ a structure capable of displacement within a predetermined range to the right and left as follows. That is, as shown in the embodiment of FIG. 11(a), the ultrasonic wave sensor 35 transforms electrical signals to ultrasonic energy to transmit. The ultrasonic wave receiving sensor 35' receives ultrasonic waves reflected from an object for transformation to electrical signals. the sensors 35 and 35' are respectively mounted to sensor holding pieces 125 and 125', which are respectively connected to a supporting base frame 130 and a rack gear 131 by hinge pins 126, 127, 128 and 129. The rack gear 131 is connected to a stepping motor 133 via a pinion gear 132, so that the sensor holding pieces 125 and 125' mounted with sensors are cooperatively moved to the right and left in response to the forward and reverse rotation of the stepping motor.

The operation with regard to a second embodiment of ultrasonic wave sensors constructed as in the foregoing will be described in the following.

When a driving current is applied to the stepping motor toward the forward direction under an initialized state as shown in FIG. 11(b), the gear 132 fixed to the motor shaft makes the rack gear 131 execute a linear movement as shown in FIG. 11(c). The rack gear 131 and the sensor holding pieces 125 and 125' connected to the supporting base frame 130 are also cooperatively moved in a predetermined direction. When the ultrasonic wave sensors 135 and 135' reach an angle A set between the rack gear 131 and the supporting base frame 130, a movement of the motor 133 is stopped. One unit of the ultrasonic wave sensors 135 and 135' maintains a displaced state by a predetermined angle under the initialized position.

As shown in the foregoing, after the movement of the motor 133 is temporarily stopped, in accordance with the control of the microcomputer 9 an ultrasonic wave interface 36 outputs pulse signals to transmit ultrasonic waves transformed to electrical signals via the ultrasonic wave transmitting sensor 35. The reflected ultrasonic waves are received by the microcomputer 9 via the ultrasonic wave sensor 35' and the interface 36. The microcomputer 9 analyses the signals transmitted from the ultrasonic wave sensor 35' and determines whether or not physical object movement due to a trespasser or the like is occurring.

Meanwhile, a driving current is applied to the stepping motor 133 toward the reverse direction under a state as shown in FIG. 11(b). The motor 133 rotates in the reverse direction as shown in FIG. 11(d) to execute a linear movement and when the motor 133 reaches a predetermined angle B where the rack gear 131 is set with the supporting base frame, the movement of the motor 133 is stopped and the operation of the ultrasonic wave sensors 35 and 35' as mentioned above is repeated. When physical object movement due to a trespasser is detected in either direction, the microcomputer 9 outputs an appropriate signal to the automatic telephone notifying means 2 through the communication means 8 and the abnormal condition is made known to outside personnel. As seen above, the detection region of the ultrasonic wave sensors 35 and 35' is widened by utilizing the ultrasonic wave sensor portion displacement means which is driven by the stepping motor. Thus, the functional efficiency of the crime prevention robot can be doubled.

Next, the interfaces 36 and 36' which drive the ultrasonic wave sensors 35 and 35' will be described in detail. When power supply 12 V is supplied to bases and emitters of transistors TR1 and TR2 through resistors R2, R5, R7 and R8, the transistors TR1 and TR2 are rendered conductive. Also, a collector current is developed at the emitters of transistors TR1 and TR2, whereby capacitors C5 and C7 are charged by the collector current. If the charge of the capacitors C5 and C7 has been completed, the emitters of the transistors TR1 and TR2 are raised in potential. Thus, the transistors TR1 and TR2 are disabled. However, if the capacitors C5 and C7 are discharged through a resistor R3, the emitter potential of the transistors TR1 and TR2 are decreased, thereby allowing the transistors TR1 and TR2 to be enabled again.

By repeating the charging and discharging of the capacitors C5 and C7 in the aforementioned manner, a pulse signal having a predetermined frequency is developed at the collector of the transistor TR1 for transfer to the ultrasonic wave transmitting sensor 35 through a conductor 136. If the ultrasonic wave thus transmitted is reflected from a mobile object such as a burglar, the reflected ultrasonic wave is sensed by an ultrasonic wave receiving sensor 35' (which will be described later).

Figure 12B:
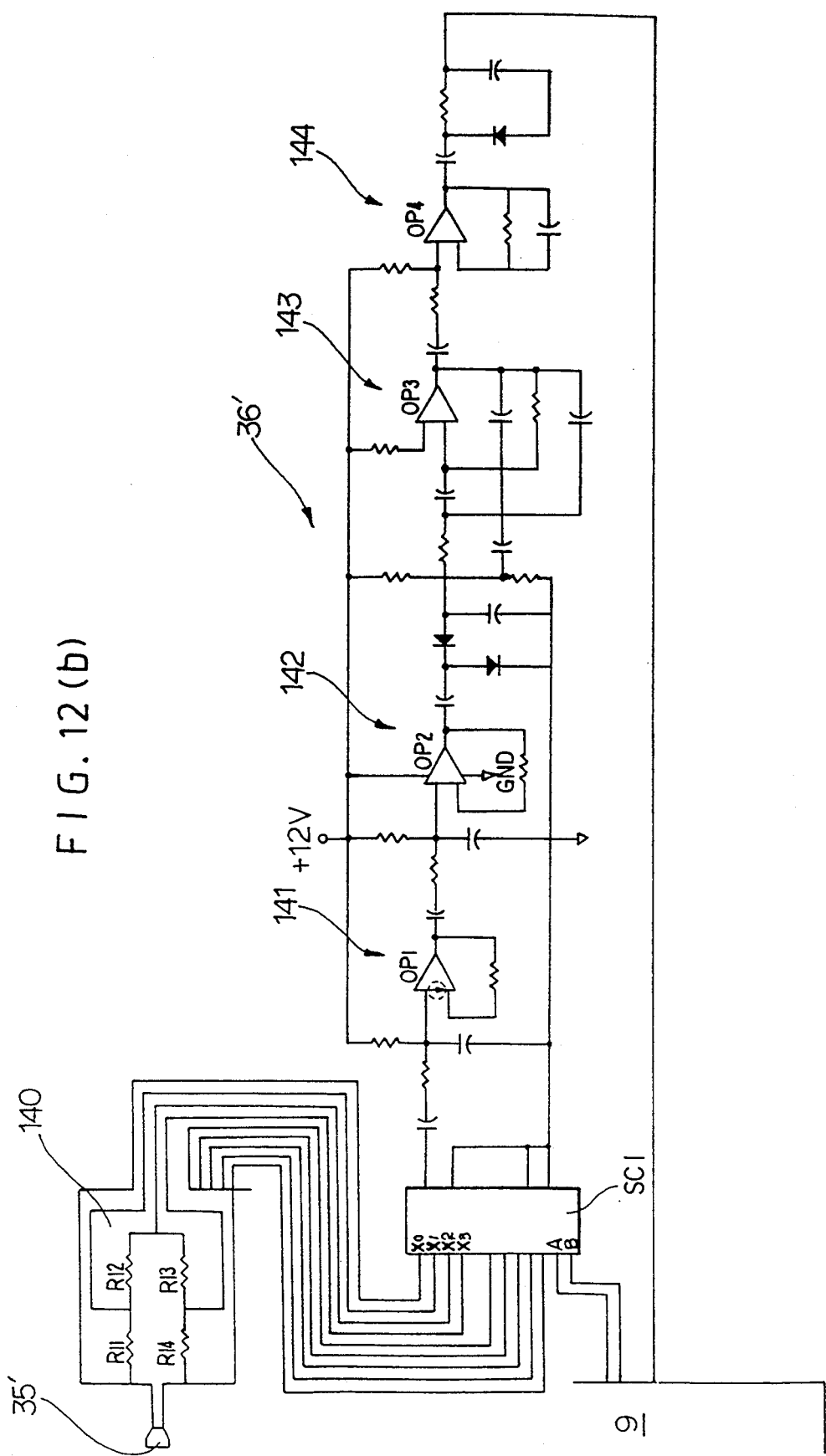
FIG. 12(b) is a detailed circuit diagram of a signal receiving portion of the interface of the mobile object detecting means.

Referring to FIG. 12(b), there is shown a configuration illustrating a detailed circuit diagram of the interface 36' which includes an ultrasonic wave receiving sensor 35'. The interface 36' comprises an ultrasonic wave receiving sensor 35', and an attenuation rate adjusting portion 140 for preventing erroneous operation of the robot due to surrounding minute noise signals caused by the ultrasonic wave receiving sensor 35'. First and second notch filter portions 141 and 142 amplify selectively the output signal of the attenuation rate adjusting portion 140 over a limited predetermined band. First and second amplifying circuits 143 and 144 amplify the filtered output signal of the first and second notch filter portions 141 and 142.

More particularly, the attenuation rate adjusting portion includes a switching circuit SC1 having an input terminal X0 directly connected to the ultrasonic wave receiving sensor 35'. An input terminal XI is connected to the ultrasonic sensor 35' through a resistor Rll, and an input terminal X2 is connected with the ultrasonic sensor 35' through resistors Rll and R12. An input terminal X3 of the switching circuit SC1 is connected to one end of a resistor R13, the other end of which is connected to the resistor R12. An input terminal X4 is connected to the ultrasonic sensor 35' via one of a resistor R14, the other end of which is connected to the other end of the resistor R13. Also, the switching circuit SC1 is supplied at input terminals A and B with a 2-bit attenuation rate selecting signal from said microcomputer 9. With the attenuation rate adjusting portion 140 constructed as described above, it is possible to obtain a proper combination of the resistors Rll, R12, R13 and R14 depending upon the attenuation rate selecting signals A and B, thereby allowing the robot to operate error free.

The ultrasonic sensed signal thus obtained in the attenuation rate adjusting portion 140 is, first, filtered at the first notch filter portion 141 including a differential amplifier OP1. Next, the sensed signal is filtered at the second notch filter portion 142 including a differential amplifier OP2 to obtain an output signal desirably amplified in amplitude. The amplified output signal is then doubly filtered by the first and second filter portions 143 and 144 and the filtered output signal is input to the microcomputer 9. Accordingly, the microcomputer 9 determines the presence of the mobile object, for example, a burglar, on the basis of the input ultrasonic-sensed signals, and performs the control to generate an alarm signal and so on, if necessary.

Figure 13:
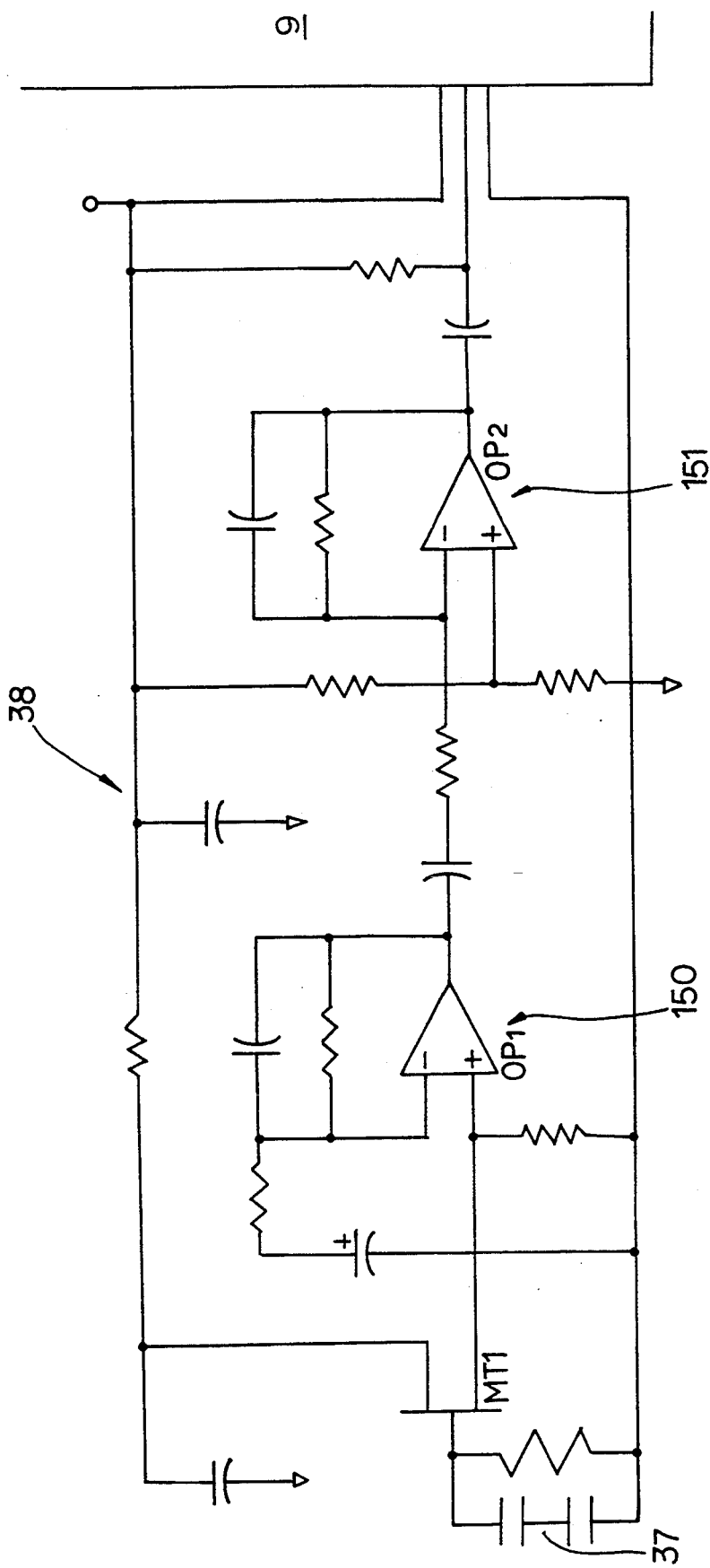
FIG. 13 is a detailed circuit diagram of the mobile object detecting means, utilizing an infrared sensor in accordance with the present invention.

Next, the interface of the infrared sensor 37 according to the present invention with reference to FIG. 13 will be described below. The infrared interface 38 is a circuit for receiving a sensed signal from the infrared sensor 37. As illustrated in FIG. 13, the sensor 37 which senses the infrared wave from a human body is connected to a gate of a MOSFET MT1. The MOSFET MT1 is connected at its source to a non-inverting terminal "+" of the amplifier OP1. The output terminal of the amplifier OP1 is connected to an inverting terminal "−" of the amplifier OP2 of a bandwidth filter portion 151. The output terminal of the amplifier OP2 is connected to the microcomputer 9.

According to the above circuit construction, if infrared radiation from a human body is sensed by any one of the sensors, for instance, sensor 37 the MOSFET MT1 is rendered conductive and the output signal thereof is input to the non-inverting terminal "+" of the amplifier OP1. The output signal amplified at the amplifier OP1 is supplied to the inverting terminal "−" of the amplifier OP2 to be filtered and the amplified output signal from the amplifier OP2 is supplied to the microcomputer 9. Thus, the microcomputer 9 determines the presence of an intruder or burglar on the basis of the input infrared sensed signal. If an intruder is present, the microcomputer 9 sends a signal corresponding to a detection of an intruder to the automatic telephone notifying means which performs a function of an auto-dialer through the communication means 8.

Figure 14:
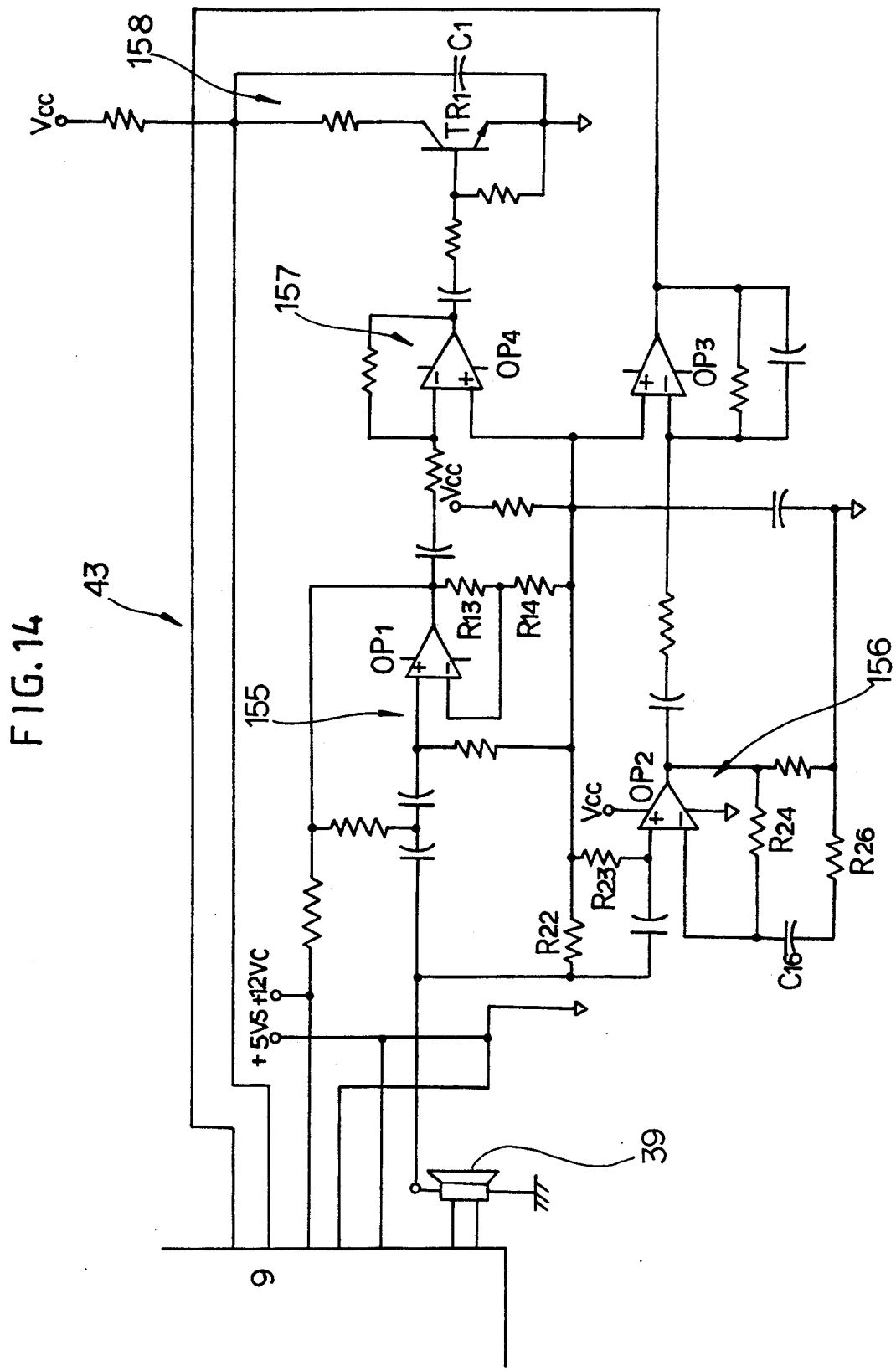
FIG. 14 is an interface of sound detecting means in accordance with the present invention.

FIG. 14 illustrates an interface circuit 43 for discriminating whether the sound signal sensed by a sound detecting sensor 39, such as a microphone, is a voice signal, such as a baby's cry, or a plosive signal due to window breakage. This circuit includes a first band pass filter 155 which comprises a first amplifier OP1 having a non-inverting input terminal "+", which is supplied with the sound sensing signal and is connected to the sound detecting sensor 39. The first amplifier OP1 has an inverting input terminal "−" connected to a node between resisters R13 and R14. The circuit includes a second band pass filter 156 which comprises a second amplifier OP2 having a non-inverting input terminal "+" into which the sound sensing signal is input through resistors R22 and R23. The second amplifier OP2 has an inverting input terminal "−" connected to resistors R24 and R26 and a capacitor C16. The circuit also includes a first differential amplifier OP3 in which the output of the first amplifier OP1 is supplied to a non-inverting input terminal "+". The circuit also includes an amplifying portion 157 wherein the output of the first amplifier OP1 is connected to a non-inverting input terminal "+" of a second differential amplifier OP4. A sound signal generating portion 158 has a switching transistor TR1 connected at a base thereof to the output side of the second differential amplifier OP3. The non-inverting input terminals "+" of the first and second differential amplifiers OP3 and OP4 are supplied with the sound signal.

With the above circuit, the signal sensed by the sound detecting sensor 39 is supplied to and filtered by the first and second amplifiers OP1 and OP2. Reference values are set so that the output signal of the first amplifier OP1 assumes a high level when the sound signal is plosive, while the output signal of the second amplifier OP2 assumes a high level when the sound signal is a voice signal. The output signal of the first differential amplifier OP3 is output as a voice signal since the output signal of the first or second amplifier OP1 or OP2 is amplified in the first or second differential amplifier OP3 or OP4. The signal output from the second differential amplifier OP4 is provided to the transistor TR1. As a result, the transistor TR1 is repeatedly switched by charging and discharging a capacitor Cl to output a rectangular-wave pulse in response to the plosive signal. The output signal of the differential amplifier OP3 has a level corresponding to the sound signal and is supplied to the microcomputer 9. Accordingly, if the signal is a plosive signal (a rectangular-wave pulse), the microcomputer 9 carries out the auto-dialing operation and the like. Alternatively, if the signal is a voice signal, the microcomputer 9 supplies the voice signal to the user having a monitor by a wireless method.

Figure 15:
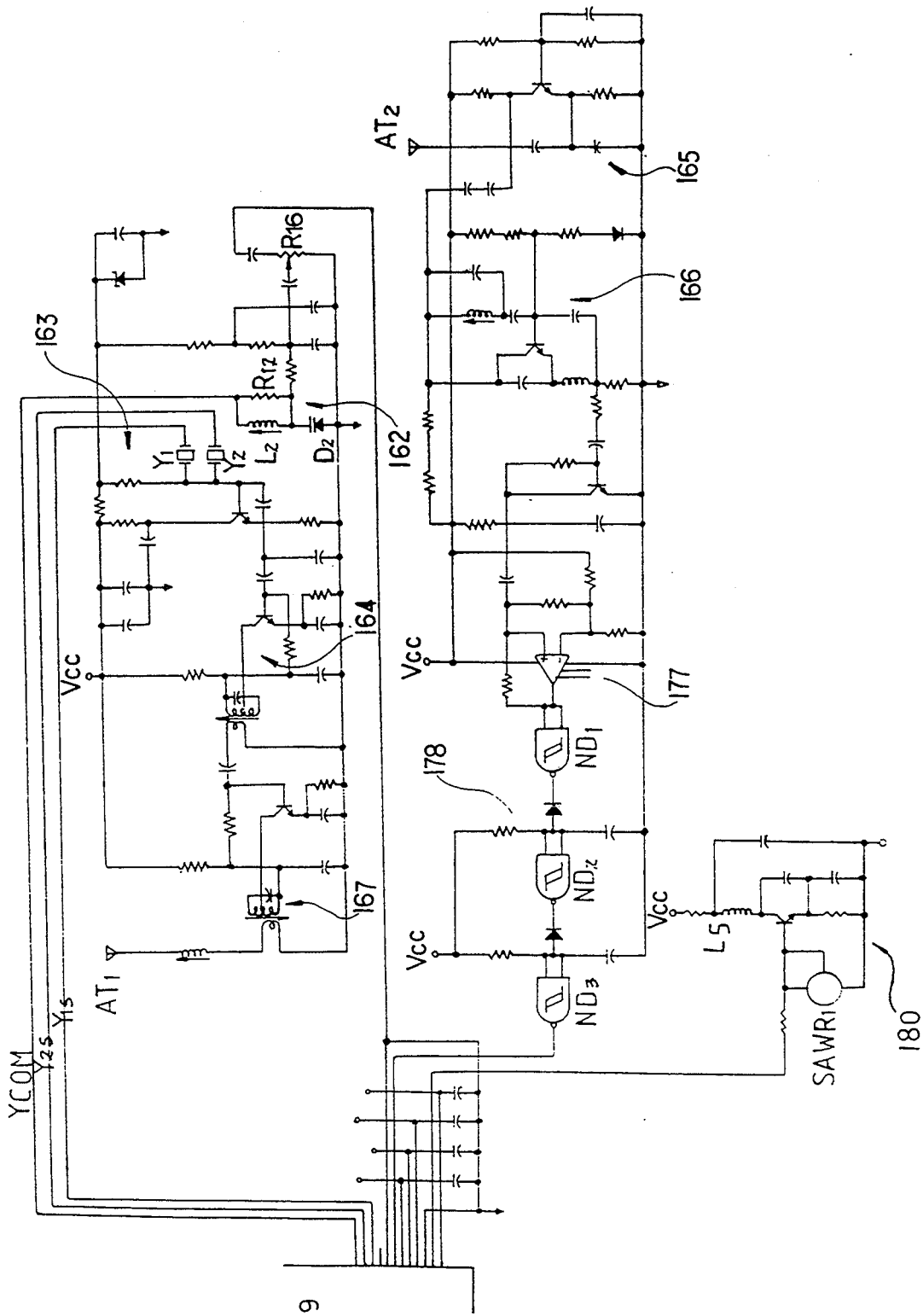
FIG. 15 is a detailed circuit diagram of the signal transmitting and receiving portion formed on the robot in accordance with the present invention.

Referring to FIG. 15, there is shown a detailed circuit diagram of communication means 8. This circuit transmits the alarm signal informing the generation of sound signal or the presence of a burglar detected from the interface circuit 43 depicted in FIG. 14. Particularly, this circuit transmits a signal related to the generation of an abnormal condition generated within the monitoring region of the robot 1 to automatic telephone notifying mean 2 which performs the auto-dialing function, or receives the signal transmitted from the monitor. The signal output from the microcomputer 9 is supplied to a modulating portion 163 through a signal input portion 162 which include a variable resistor R16, a varactor diode D2, an inductor L2, a resistor R12 and so forth. The microcomputer 9 provides frequency selection signals Y1S and Y2S capable of varying a modulation frequency. The frequency selection signals Y1S and Y2S are selected by the user to prevent interference.

The quartz-crystal oscillators Y1 and Y2 are energized by the frequency selection signals Y1S and Y2S selected by the user, and a predetermined frequency is emanated from the oscillators Y1 and Y2. The signals from the oscillators are supplied to a modulator 163 and modulation signals are output from the microcomputer 9. The modulated signals are transmitted to an antenna AT1 through a high frequency amplifying portion 164 and a signal transmitting portion 167 in a well-known manner. Thus, signals from the microcomputer are transmitted to the automatic telephone notifying means 2 and an emergency measure means (to be explained later).

Meanwhile, a signal, such as a command, transmitted from the automatic telephone notifying means 2 is input to a radio signal input portion 165 through the antenna AT1. The input signal is demodulated by a demodulator portion 166, amplified by an amplifying portion 177 and then wave-shaped through a wave shaping portion 178 including serial NAND gates ND1, ND2 and ND3. Accordingly, the microcomputer 9 analyzes the input signal and performs control to execute the corresponding function.

The sound signal detected by the interface circuit 43 (FIG. 14) is transmitted to the monitor 4 through the sound detection transmitting portion 180. Under the control of the microcomputer 9 and using a high frequency oscillated signal and a high frequency oscillating element SAWR1 as a carrier wave, the sound signal is transmitted through a pattern inductor L5. This signal is transmitted to the user having a monitor 4.

Figure 16:
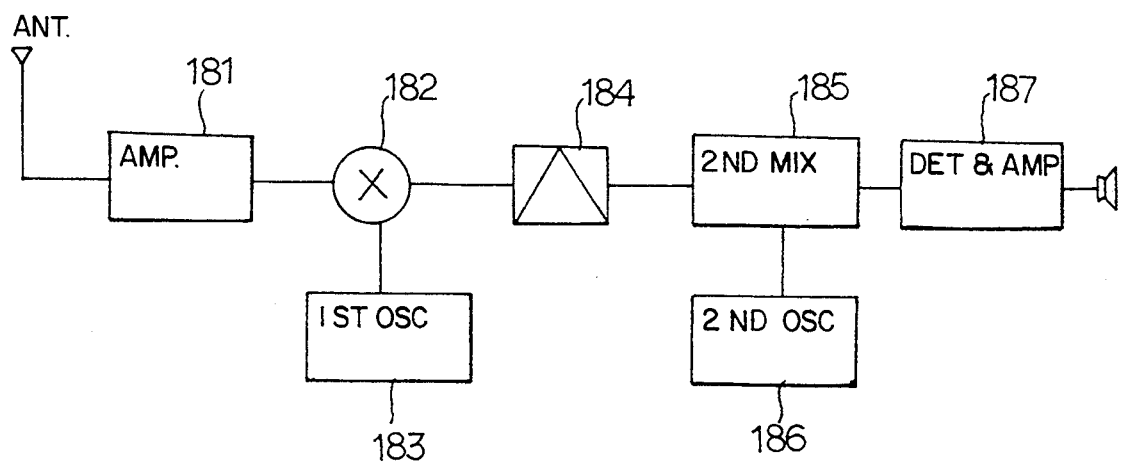
FIG. 16 is an internal circuit diagram of a monitor in accordance with the present invention.

As illustrated in FIG. 16, when the sound radio signal is received by an antenna of the monitor 4, an amplifying portion 181 amplifies the signal and improves the S/N ratio. Next, the signal is supplied to a first mixer 182. The first mixer 182 mixes the signal from the amplifier 181 and the oscillating frequency supplied from a first local oscillator 183. A first intermediary frequency signal corresponding to a difference thereof is output to a second mixer 185 through a filter 184. The second mixer 185, along with the first mixer 182, mixes the oscillating frequency supplied from a second local oscillator 186 and the first intermediary frequency signal from the filter 184 to thereby output the second intermediary signal. The second intermediary frequency signal is output as a voice through a speaker after being detected at a detection and amplification portion 187. The user monitors the conditions occurring in the monitoring region of the robot 1 after listening to the audio signal. Thus, the baby's cry, calling sound or a sound produced by people can be monitored within a desired region of space.

The present invention mobile detection system comprises an automatic telephone notifying means 2 which is provided with radio transmitting and receiving functions for notifying an external location, through a telephone line, the generation of an abnormal condition detected by the robot while executing two-way communication with the robot. The automatic telephone notifying means 2 provided within the monitoring region of the robot maintains a two-way communication between the robot and the automatic telephone notifying means. In this manner, the robot notifies a user who happens to be away, police station, fire station or central monitoring unit such as a control room.

Figure 17A:
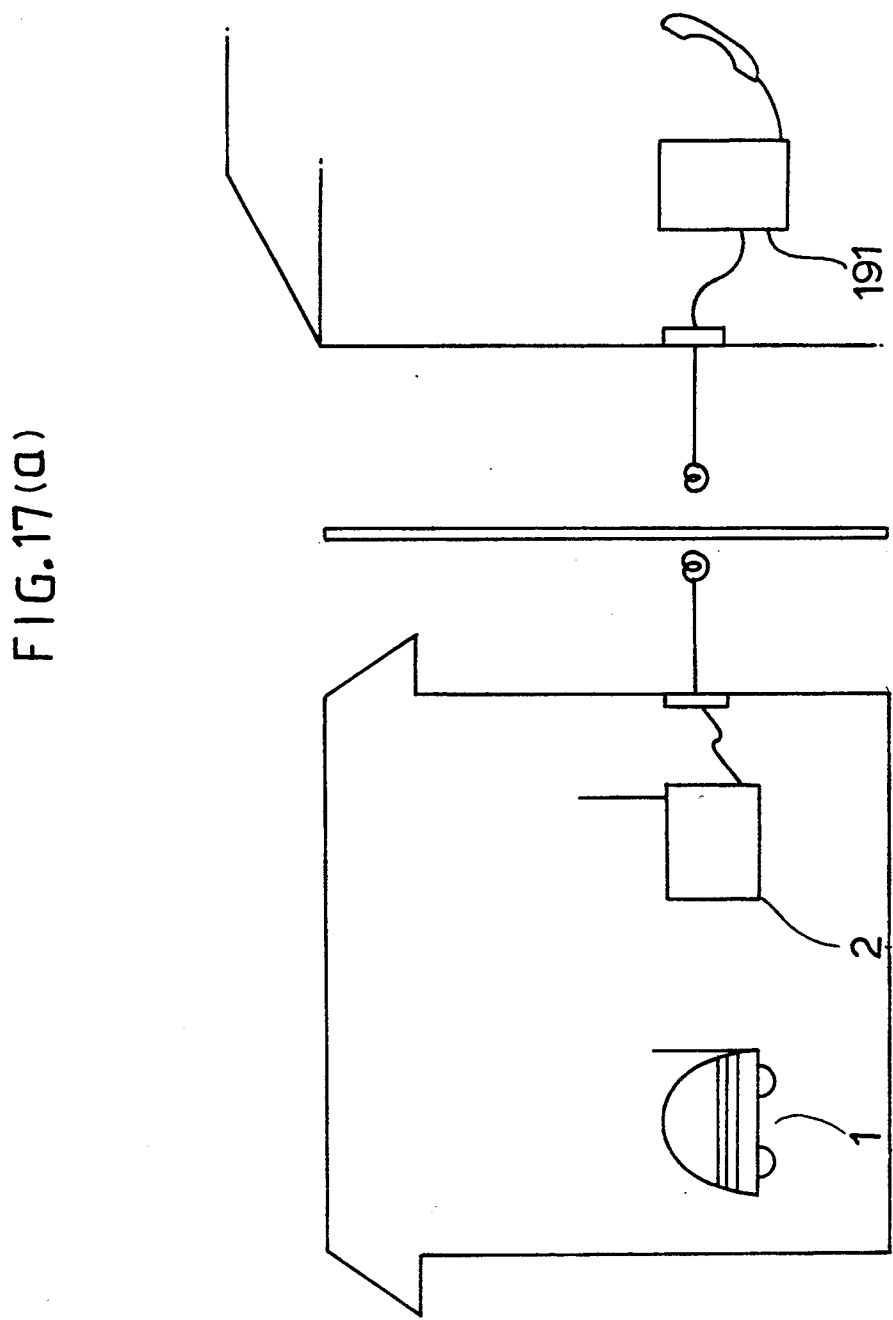
FIG. 17(a) is an overall block diagram of an automatic telephone control means in accordance with the present invention.

A preferred embodiment of the automatic telephone notifying means in accordance with the present invention is described in detail with reference to the accompanying drawings. FIG. 17(a) shows a schematic diagram wherein the user who happens to be away is alerted for the generation of an abnormal condition in accordance to the two-way communication between the automatic telephone notifying means and the robot. The automatic telephone notifying means 2 receives via a radio a signal of the abnormal condition transmitted from the robot 1 and notifies a pre-set location outside the home by using a telephone circuit 190.

When the outside user performs a control operation from a random location, such as an outside public telephone 191, the control signal is received by the telephone circuit 190 and is transmitted to the robot via radio, which accordingly operates the robot in accordance with the control signal. During operation, the automatic telephone notifying means 2 receives a radio response code transmitted from the robot 1. Upon receipt, the notifying means synthesizes a response message previously established in accordance with a present situation and transmit the synthesized message to a pre-subscribed user via the telephone circuit 190 to allow the user to take proper actions.

Figure 17B:
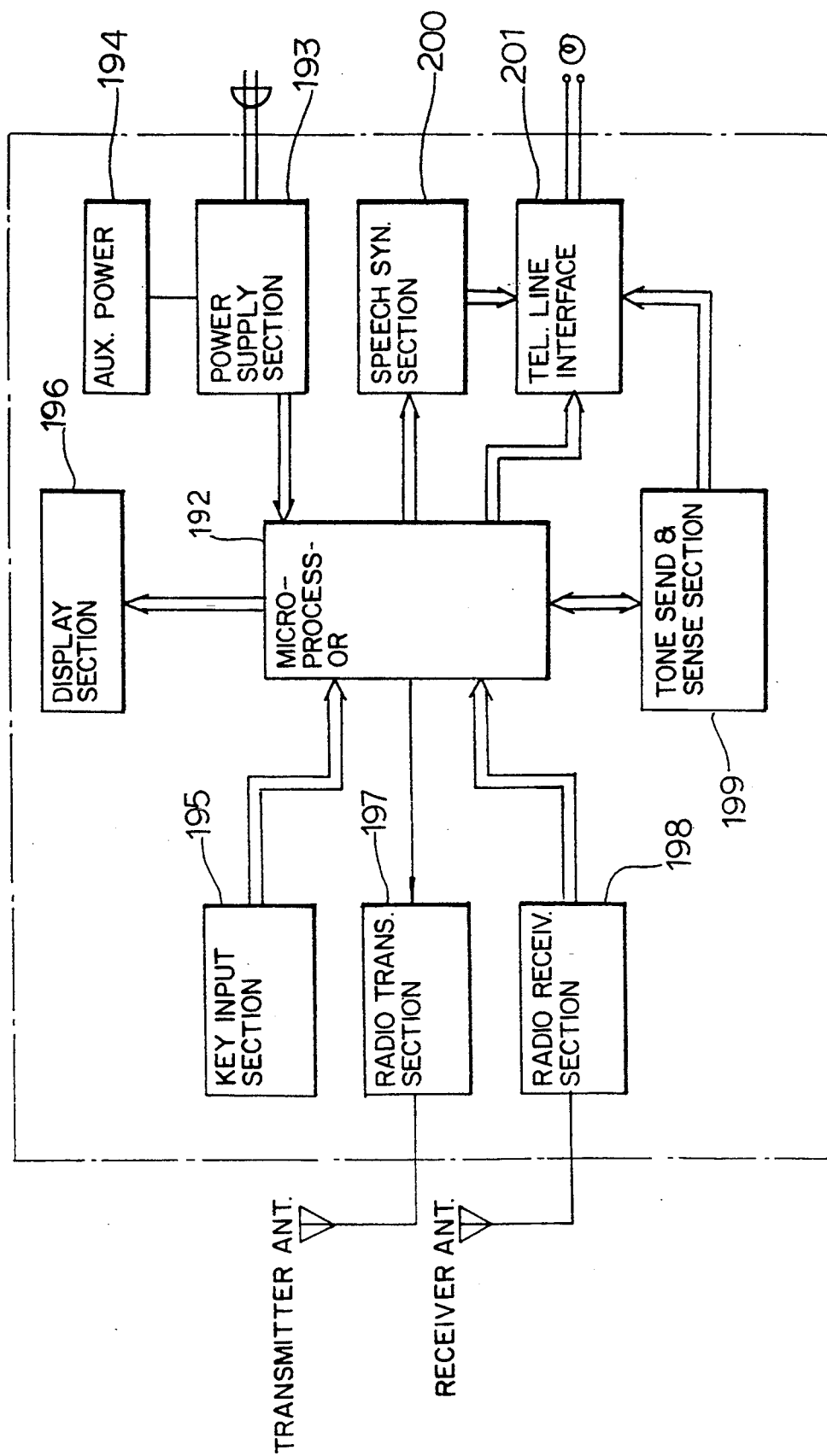
FIG. 17(b) is a block diagram of FIG. 17(a).

FIG. 17(b) is a block diagram of the automatic telephone notifying means illustrating the operating sequence according to the present invention. In FIG. 17(b), reference numeral 192 is a microprocessor which controls an automatic notifying function, a key function of the automatic telephone notifying means 2. Number 193 is a power supply section which receives a commercial power to thereby power the system. Numeral 194 is an auxiliary power supply section which can substitute a rechargeable battery for the main power supply 193 when the voltage supplied by the main power supply section 193 drops below its regular value. This substitution ensures that normal power can be supplied for a predetermined period of time even though there is a power interruption. Reference numeral 195 is a key input section comprised of a plurality of keys for inputting signals required for operation of the automatic telephone notifying means to the microprocessor 192. Numeral 196 is a display section comprised of, e.g., a plurality of light emitting diodes which may be turned ON by the microprocessor 192 to display the operating state of the robot as well as the operating state of the automatic telephone notifying means 2. Numeral 197 is a radio transmitting section which, when an external user inputs a control signal for controlling the robot, transmits the control signal on the robot via the radio.

Reference numeral 198 is a radio receiving section which receives signals from the robot 1 and directs its output to the microprocessor 192. Numeral 199 represents a telephone tone sending and sensing section which generates telephone tones (or dial pulses) for calling and connecting a remote telephone in case an emergency signal is discriminated from among the signals sent from a radio receiving section 198. Also, the telephone sensing section 199 senses various control signals sent via a remote telephone operated by an external user and translates and inputs these signals to the microprocessor 192. A speech synthesizing section 200 reproduces previously-recorded messages in response to a given emergency situation to thereby send the message to the external previously-subscribed user (or other location) via a telephone line interface 201.

In accordance with the automatic telephone control unit thus constructed according to the present invention, when power is supplied from a power supply section 193 and a telephone number of the user is subscribed and input to the microprocessor 192 through a key input section 185, the input data is displayed on a display section 196. Furthermore, when an external user inputs a control signal for controlling the robot by voice or tone, etc., through the public telephone line, the control signal such as voice or tone is sensed at the sending and sensing section 199 through the telephone line interface 201, to thereby be translated and inputted to the microprocessor 192. The microprocessor 192 then controls the radio transmitting section 197 and the control signal corresponding to the voice signal is relayed to the robot to control the same.

When an emergency situation signal is input to the radio receiving section 198 from the robot 1, the microprocessor 192 controls the sending and sensing section 199 to generate telephone calling tones. The microprocessor 192 also connects sensing section 199 and the telephone line 190 through the telephone line interface 201 to communicate to the external user. The microprocessor 192, if necessary, generates a speech message utilizing the speech synthesizing section 200 and connects the speech signal to the previously-subscribed user through the telephone line interface 201.

The operational sequence of the automatic telephone notifying means will now be described in detail with reference to the flow chart of FIG. 17(c). The automatic telephone notifying means 2 according to the present invention maintains a standby state at step S1. At step S2, it discriminates whether or not an emergency situation signal is input from the robot 1 as well as whether or not a control signal is input by an external user. Namely, the automatic telephone notifying means 2 discriminates whether or not an emergency situation signal is received from the robot 1 and input to the microprocessor 192 through the radio receiving section 198. The notifying means 2 also discriminates whether or not a voice signal for controlling the robot 1 is input via the telephone circuit line 190 to the telephone line interface 201 and the sending and sensing section 199. As a results of this discrimination, when neither the emergency situation signal nor the voice control signal is input, that is, in the case of NO, the flow returns to step S1, and the sequences are repeated.

Meanwhile, when the emergency situation signal is input from the robot, that is, in the case of YES, the flow advances to step S3 and the microprocessor 192 controls the telephone line interface 201 to open (off-hook) the telephone line 190. Then, at step S4 it sends a control signal to the telephone tone sending and sensing section 199 so as to select one of the previously-subscribed communication areas which can cope with the emergency situation and dial the telephone number corresponding to the selected communications area. The corresponding telephone number is then dialed by the telephone tone sending and sensing section 199, and discrimination is made at step S5 as to whether or not the dialed telephone number is busy.

As a result of receiving the busy signal at step S5 (in the case of YES), at step S6, the interface 201 takes the line on-hook under control of the microprocessor 192 (the telephone line is off). Thereafter, when a predetermined time period has elapsed, process returns again to step S3 and repeats the dialing action to the corresponding telephone number. When the ring back tone exists (the corresponding telephone number is not busy), the process flow proceeds to step S7, and discrimination is made as to whether the receiver has been picked up. When the receiver is not picked up, a predetermined waiting period is initiated. If the receiver is picked up (in the case of YES), the flow advances to step S8, and either a message or situation code corresponding to the emergency situation and previously recorded is output via the speech synthesizing section 200, which repeatedly sends the message a predetermined number of times.

At step S8, it is detected whether or not the message or situation code sending is complete. When it is completed (in the case of YES), at step 10 the telephone line interface 201 takes the line to the on-hook condition (the telephone line is off). Of course, when the sending operation is finished, the standby state of step S1 is resumed, and emergency situation signal sensing is again discriminated to thereby execute the necessary actions. On the other hand, when a speech signal corresponding to a control signal of the robot 1 is received from a remote telephone and reaches the microprocessor 192 at step S2, the microprocessor 192 controls the telephone line interface 201 and connects the line at step S11. At step S12 the microprocessor 192 controls the speech synthesizing section 200 such that the user is prompted to input a secret number, and then enters a receiving standby state. While maintaining the receiving standby state, at step S13, whether or not the secret number is received as a telephone tone or otherwise through the telephone line 190 is detected. When the code is received (in the case of YES), control advances to step S14 where the telephone tones are converted by the telephone tone sending and sensing section 199 into a control code capable of input to the microprocessor 192.

At step S15, it is determined whether or not the secret code number of the control code that the microprocessor 192 has received from the sending and sensing section 199 coincides with the stored code. As a result of the discrimination at step S15, when the secret number is incorrect (in the case of NO) control proceeds to step S21 and cuts off the telephone line and returns to the standby state of step S1. When the secret code number matches (in the case of YES), flow advances to step S16 and a message is sent by the speech synthesizing section 200 to prompt the external user to input a control code. The control code thus input is received at step S17 by the microprocessor 192 via the telephone tone sending and sensing section 199. The microprocessor 192 receives the control code generates at step S18, the radio control signal corresponding to the control code, and sends the same to the robot 1 through the radio transmitting section 197.

The robot 1 receives the control signal from the radio transmitting section 197, executes the corresponding control operation, and thereafter sends a result signal via radio at step S19. The radio receiving section 198 of the automatic telephone notifying means 2 receives this signal. The microprocessor analyzes it and sends a state message corresponding to the contents analyzed at step S20 through the telephone line interface 201 to the telephone line 190, thereby making the external user take actions. Since the automatic telephone notifying means 2 of the present invention facilitates control of the robot from a remote location, appropriate control is possible and the robot is effectively utilized.

Next, an emergency measure unit 47 controlled by a transmitted signal of the robot 1 in the mobile detection system of the present invention is described with reference to FIGS. 18(a)–18(c). The emergency measure unit 47 is designed to immediately take necessary emergency measures in order to minimize loss or damage where there is detected a gas leak, a fire or an intruder. According to the invention, in order to attain the object, control is performed by a microprocessor 204 which has received a signal from a receiving section 205 contained within the robot 1. When a gas leak occurs, a solenoid valve 210 is operated and an door 214 is opened by the driving of a motor 213, and a gas valve 211 is shut whereby the gas leak is stopped and leaked gas is discharged outside the premises. When a trespasser is detected, another solenoid valve 206 is operated and a shutter 208 is closed by the driving of a motor 207. Gas is ejected from a gas sprayer 209 as an emergency measure to minimize the damage that the trespasser cannot escape.

A preferred embodiment of the emergency measure unit according to the invention will now be described in detail with reference to the attached drawings. In the present mobile detection system, the microcomputer 9 receives a signal detected by ultrasonic/infrared detecting sensors 35 and 37 and judges whether a trespasser exists. When a trespasser exists, the microcomputer 9 transmits an abnormal condition signal to a receiving section of the emergency measure unit 47 as illustrated in FIG. 18(a). The solenoid valve 206 is operated and a motor 207 is driven whereby a shutter 208 provided at the doors or windows is shut to thereby prevent the trespasser from escape, and at the same time, the gas sprayer 209 is operated to eject gas to minimize the damage.

When a gas leakage is detected by the gas leakage detecting sensor 42, similarly to the above, a signal is transmitted from a communication means 8 and received at the receiving section 205 of the emergency measure unit 47 by the microprocessor 204. A solenoid valve 210 is operated and a gas valve 211 is shut. Simultaneously a signal is output to a door driving section 212 and another motor 213 is driven whereby a door 214 is opened. A signal for driving a fan motor driving section 215 may also be output whereby the fan motor 216 is driven so that the gas accumulated within a room can be exhausted to the exterior so as to prevent a break-out of fire. When a gas leak or a trespasser exist, a warning lamp 217 mounted at the microprocessor 204 is lighted and simultaneously a buzzer 218 is sounded to thereby identify the abnormal state to the outside.

The operating sequence of the emergency measure unit will be described with reference to the flow chart as shown in FIG. 18(b). When the robot i is stopped at an appropriate position, at step S1, a judgement is made as to whether or not any sound is detected from a sound detecting sensor 39. If not (in the case of NO), continual execution of this function is performed. At step S2, emission of the ultrasonic wave from the ultrasonic wave sensor 35 and reception of its reflection are performed. At step S2, a judgement is made as to whether or not there is a trespasser. If not (in the case of NO), at step S3, infrared rays generated by a human body are detected by the infrared ray sensor 37. At steps S1, S2 and S3, in the case of detection of unusual sound (in the case of YES) and/or in the case of detecting the front or backward movement of a trespasser and/or infrared rays generated by human body, the flow proceeds to the step 6 where judgement is made as to whether or not there is a trespasser.

When there is no trespasser (in the case of NO), a detecting operation of ambient temperature variations and smoke particles (to be explained later) is performed. When there is a trespasser (in the case of YES), flow proceeds to the step S7. A signal is issued from the microcomputer 9 to drive the communication means 8 to transmit a signal representing the abnormal state through the antenna ANT whereby the automatic telephone notifying means 2 and emergency measure unit 47 are driven. The user thus is informed and simultaneously, automatic dialing to a police station, fire station, etc., is carried out, so that the generation of abnormal state is advised to a house or an office. Simultaneously, a warning lamp 217 and a buzzer 218 are operated to generate a warning sound and inform the outside, under the control of the microprocessor 204 of the emergency measure unit 47. The motor 207 is operated to drive the motor driving section 219 so as to drop the shutter 208 provided at the windows or doors and to operate the gas sprayer 209 to thereby trap the trespasser and minimize the damage. Following these steps, the trespasser watching function is terminated.

Furthermore, at step S4, the microcomputer 9, in a state where the robot i is stopped, judges whether or not there is any sudden ambient temperature change utilizing the drive of a temperature sensor 40. When the temperature does not exhibit sudden changes, that is, in the case of NO, subsequent operations are executed. In the case of YES, its signal is input to the microcomputer 9, which judges that indoor temperature has changed suddenly, and which in turn drives the automatic telephone notifying means 2 via the communication means 8. The central monitoring center connected to the automatic telephone notifying means 2 is thus made to take necessary actions. At step S5, the microcomputer 9, in a state where the robot is stopped, judges whether or not there is a gas leak. When no gas leaks are present (in the case of NO), the flow proceeds to step S8, so that the robot can keep moving and performing the monitoring function.

If a gas leakage is detected, that is, in the case of YES, the microcomputer 9 judges that there is a gas leak. At step S7, a signal representing the gas leak is output from the microcomputer 9 which drives the communication means 8. The automatic telephone notifying means 2 and emergency measure unit 47 are in turn driven to inform by automatic dialing to a police station, a fire station, or other central monitoring unit that an abnormal state has occurred in a house or an office. At the same time, the warning lamp 217 is lit and a buzzer 218 is operated to generate the warning sound to thereby inform to the outside. The solenoid valve 210 is operated to shut the gas valve 211 to stop the gas leak. The solenoid valve 210 is operated to drive the door open driving section 212 and thus drive the motor 213 in a direction to open a door 214. Thereafter the fan motor driving section 215 is operated to drive the fan motor 216 to thereby vent the gas to the exterior. Next, the flow proceeds to step S8 and the robot keeps moving and performing the monitoring functions.

According to the mobile detection system of the present invention, when a gas leak is detected, a solenoid valve shuts the gas opening/closing valve to thereby stop the gas leak and drives a motor in a forward direction to open a window or a door and then drive a ventilation fan to ventilate the air. Thereafter, the window or door is shut by the motor driving in a backward direction. Suffocation by gas leak or by fire can thus be prevented, and when there is an intruder, the steel shutter provided at the window or the door is shut to block the exit or access. Furthermore, the gas sprayer is operated to gas the trespasser, so that he can be instantly knocked out and the damage can be minimized.

The above description explains a mobile detection system, in which a shutter is driven to seal the room by the motor 7 driving and the gas sprayer is driven to knock the trespasser out instantly to thereby minimize the damage. However, the present invention is not limited to such operation and can include any necessary emergency measure. As described above, according to the mobile detection system of the present invention, a number of cables are not required and as a result, less labor and installation costs are needed. Furthermore, various detecting sensors provided at the robot can not be unsightly as compared with the conventional house security system which requires the use of sensors in a variety of locations. In particular, because the associated wiring works of detecting sensor are not used, there is no problem that the wiring (or the power supply line) can be cut by the intruder to thereby allow the user to operate this mobile detection system at his will.

What is claimed is:

1. A mobile detection system mounted on a robot, which is movable in order to execute multiple detecting functions to detect abnormal conditions within a monitoring region, said detection system comprising:
   a microcomputer for identifying when an abnormal state arises within the monitoring region and for controlling movement of said robot;
   a drive operating system controlled by the microcomputer and including:
      driving means for providing forward and reverse driving power to the robot, and
      steering means for altering a direction in which the robot moves;
   navigation means for emitting an object detection signal and receiving said object detection signal which is reflected from an object in the monitoring region in order to detect the object, said navigation means outputting, to the microcomputer, a signal identifying the object;
   abnormal condition detection means for detecting generation of abnormal states within the monitoring region and for outputting, to the microcomputer, a signal representative of the abnormal condition; and
   communication means for transmitting the signal, representative of the abnormal condition, to a location external to the monitoring region;
   faulty surface detecting means having at least two sensors which detect surface faults, said faulty surface detection means being operatively coupled to said drive operating system to cause said robot to reverse its direction when one of said sensors detects a surface fault and subsequently move forward and turn in a direction away from a side on which said one of said sensors is mounted.

2. A mobile detection system as defined in claim 1, wherein the communication means includes signal receiving means for receiving a robot control signal, which is transmitted from said location external to the monitoring region.

3. A mobile detection system as defined in claim 1, wherein the drive operating system includes a driving detecting sensor which is mounted near a powerless wheel on the robot for detecting a driving condition of the robot and for outputting the detected signal to the microcomputer for detecting movement of the robot.

4. A mobile detection system as defined in claim 1, wherein the drive operating system includes a speed detecting sensor which, in the operation of a driving motor, senses a magnitude of inverse electromotive force generated from the driving motor and outputs to the microcomputer a sensed signal for sensing a speed of the robot.

5. A mobile detection system as defined in claim 1, wherein the drive operating system includes motion means mounted on said steering means.

6. A mobile detection system as defined in claim 5, wherein the steering means includes a rotary disc member with which a sun gear is meshed.

7. A mobile detection system as defined in claim 6, wherein the steering means includes a steering detection sensor which is mounted near the rotary disc member for detection of the moving state of the robot to steer the robot.

8. A mobile detection system as defined in claim 1, wherein said faulty surface detecting means includes a pair of drop sensors provided on a bottom surface of the robot in order to detect non-planar conditions.

9. A mobile detection system as defined in claim 8, wherein the drop sensors includes a lever having a ball on one end and a magnet on another end thereof, and a magnetic field sensing element formed perpendicularly to the magnet.

10. A mobile detection system as defined in claim 1, wherein the abnormal condition detection means include:
an ultrasonic sensor for detecting an object moving in said monitored region by emitting ultrasonic waves and receiving reflective waves thereof;
an infrared ray sensing sensor which receives the infrared waves reflected from the moving object to detect the moving object;
an ionization sensor for detecting smoke particles;
a sound detecting sensor for detecting sound;
a gas leak detector for detecting a gas leaks; and
a temperature sensor for detecting an ambient temperature.

11. A mobile detection system as defined in claim 1, wherein the communication means includes a keyboard for entering a secret code and a function code.

12. In a mobile detection system having a robot, a method for performing crime and fire preventive functions during movement of the robot, comprising the steps of:
establishing a driving unit with respect to an absolute position by initiating the robot and detecting a steering detecting sensor;
driving a drive operating system after analyzing an obstacle detected by a navigation unit and determining a distance to the obstacle and a direction in which the robot must move to avoid the obstacle;
determining whether or not a faulty surface exists on a running surface of the robot by operating a driving sensing unit;
controlling a driving condition of the robot, a moving speed of the robot, and a steering angle of the robot to avoid the faulty surface;
performing crime and fire preventive functions by operating an abnormal condition detection unit while the robot is stopped; and
informing a remote location of a situation which has occurred, said situation including at least one of an intruder entering a monitored region and a fire.

13. A mobile detection system including a robot, which is movable in order to execute multiple detecting functions to detect abnormal conditions within a monitoring region, said detection system comprising:
a microcomputer for discriminating an occurrence of an abnormal condition within the monitoring region and for sending a signal to peripheral equipment to control a moving state of the robot;
a drive operating system, controlled by the microcomputer, which includes:
driving means for providing forward and reverse driving power and
steering means for changing a direction of the robot;
navigation means for monitoring the region surrounding the robot by emitting ultrasonic waves and simultaneously receiving reflected ultrasonic waves and for outputting, to the microcomputer, a signal representative of an object within the monitored region;
faulty surface detecting means having at least two sensors which detect surface faults, said faulty surface detection means being operatively coupled to said drive operating system to cause said robot to reverse its direction when one of said sensors detects a surface fault and subsequently move forward and turn in a direction away from a side on which said one of said sensors is mounted;
abnormal condition detection means for detecting an abnormal state occurring within the monitoring region and for outputting a representative signal to the microcomputer;
communication means which comprises:
a signal transmitting portion for transmitting the detected abnormal state to a location outside the monitored region and
a signal receiving portion for receiving a control signal for the robot sent from said outside location, said received control signal being performed by the microcomputer; and
automatic telephone notifying means for supplying peripheral conditions to pre-listed addresses in the microcomputer based on signals received from the transmitting portion of the communication means.

14. A mobile detection system as defined in claim 13, wherein the automatic telephone notifying means further comprises radio receiving and transmitting portions for operating the robot via a telephone.

15. A mobile detection system as defined in claim 13, wherein the automatic telephone notifying means comprises;
a microcomputer;
a key portion for inputting a program to the microprocessor;
a radio receiving portion which receives an emergency condition sensing signal and a control reply signal from the robot which is input to the microcomputer;
a telephone tone generating and sensing portion for sensing a call and simultaneously for receiving a telephone message control signal from an external user;

a speech synthesizing portion for synthesizing and reproducing a speech message in accordance with a sensed situation under control of the microprocessor;

a radio transmitting portion for transmitting a control signal to the robot in a wireless method in accordance with the telephoned message control signal received from a telephone network line; and a display portion for displaying the input signal and the current state of the robot;

faulty surface detecting means having at least two sensors which detect surface faults, said faulty surface detection means being operatively coupled to said microcomputer to cause said robot to reverse its direction when one of said sensors detects a surface fault and subsequently move forward and turn in a direction away from a side on which said one of said sensors is mounted.

16. A mobile detection system as defined in claim 15, wherein the microprocessor is connected to an interface of a telephone line.

17. A mobile detection system as defined in claim 15, wherein the microprocessor is connected to a telephone line via telephone tone generating and sensing portions.

18. A mobile detection system mounted on a robot, which is movable in order to execute multiple detecting functions to detect abnormal conditions within a monitoring region, said detection system comprising:

a microcomputer for identifying when an abnormal state arises within the monitoring region and for controlling movement of said robot;

a drive operating system controlled by the microcomputer and including:

driving means for providing forward and reverse driving power to the robot, and steering means for altering a direction in which the robot moves;

navigation means for emitting an object detection signal and receiving said object detection signal which is reflected from an object in the monitoring region in order to detect the object, said navigation means outputting, to the microcomputer, a signal identifying the object;

abnormal condition detection means for detecting generation of abnormal states within the monitoring region and for outputting, to the microcomputer, a signal representative of the abnormal condition; and communication means for transmitting the signal, representative of the abnormal condition, to a location external to the monitoring region;

faulty surface detecting means having at least two sensors which detect surface faults, said faulty surface detection means being operatively coupled to said drive operating system to cause said robot to reverse its direction when one of said sensors detects a surface fault and subsequently move forward and turn in a direction away from a side on which said one of said sensors is mounted.

19. A mobile detection system for detecting abnormal states within a monitoring region, said system comprising:

a microcomputer for, after discriminating a generation of an abnormal state within the monitoring region, sending a signal to peripheral equipment to control movement of a robot;

a drive operating system including driving means for propelling the robot in forward and reverse directions and steering means for changing a direction of the robot, said driving operating system being controlled by the microcomputer;

navigation means for emitting ultrasonic waves and simultaneously receiving reflected waves to monitor the monitoring region of space, said navigation system supplying a signal representing detection of an object to the microcomputer;

abnormal condition detection means for detecting abnormal states generated within the monitoring region of space and for outputting a detected signal to the microcomputer;

said robot includes:

a signal transmitting portion for transmitting to a remote location signal indicative of the generation of an abnormal state;

a signal receiving portion for outputting a control signal for said robot sent from the remote location; and communication means which is controlled by the microcomputer, for allowing said robot to communicate with said microcomputer, said robot being mounted with the transmitting and receiving portions and the communication means in an integral assembly and being controlled by the microcomputer to perform movement and monitoring functions; and emergency measure means for effecting emergency measures with the monitoring region necessary for minimizing damage during a generation of an emergency situation.

20. A mobile detection system as defined in claim 19, wherein the emergency measure means comprises;

a fan motor driving portion;

a gas valve control portion;

a door driver portion;

a steel shutter driving portion; and an alarm portion.

21. A faulty surface detector system for use with a robot, for detecting a faulty condition of a driving surface of the robot, comprising:

a roller member for rotating in contact with the driving surface;

a lever having two ends, the roller member being disposed on one end of the lever and a magnet being disposed on another end of the lever; and drop sensors which include a magnetic field sensing element for sensing the magnetic field of the magnets and thus the position of the rolling members.

22. A faulty surface detector system as defined in claim 21, wherein said levers are connected to a bottom plate of the robot by a hinge pin and the magnetic field sensing element is mounted on the bottom plate to face the magnet mounted on the lever.

23. A driving sensor system, for use with a robot, for sensing a driving condition of the robot, comprising:

drop sensors for detecting a faulty surface existing on a driving surface of the robot;

a drive adjustment detecting sensor for detecting a drive condition of wheels mounted on a bottom of the robot;

a speed detecting sensor for detecting a moving speed of the robot by detecting inverse electromotive force generating from a stator coil of a driving motor of the robot;

a steering detecting sensor for detecting, during an initial start of the robot, whether or not driving means, for driving the robot, mounted on a rotary disc member on the robot has reached a predetermined position; and an encoder for discriminating a steering angle of the robot by converting revolutions of the steering motor of the steering means to pulses which are indicative of the steering angle if an obstacle is sensed during an operation of the robot.

* * * * *